(12) United States Patent
Takahashi et al.

(10) Patent No.: US 7,532,350 B2
(45) Date of Patent: May 12, 2009

(54) PRINTING METHOD AND PRINTING APPARATUS

(75) Inventors: Tomohiro Takahashi, Nagano-ken (JP); Shoji Kojima, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1071 days.

(21) Appl. No.: 10/673,361

(22) Filed: Sep. 30, 2003

(65) Prior Publication Data
US 2004/0212830 A1    Oct. 28, 2004

(30) Foreign Application Priority Data

| Oct. 2, 2002 | (JP) | ............................. 2002-290406 |
| Sep. 9, 2003 | (JP) | ............................. 2003-317214 |
| Sep. 9, 2003 | (JP) | ............................. 2003-317215 |

(51) Int. Cl.
*G06K 15/00* (2006.01)

(52) U.S. Cl. ..................................... 358/1.16; 358/404

(58) Field of Classification Search ................ 358/1.16, 358/3.12, 426.05, 3.22, 401, 1.5, 404, 444, 358/449; 399/83
See application file for complete search history.

(56) References Cited

U.S. PATENT DOCUMENTS

| 3,643,016 | A | * | 2/1972 | Dattilo | .......................... 358/438 |
| 3,909,515 | A | * | 9/1975 | Evansen | ................. 358/426.12 |
| 5,333,057 | A | * | 7/1994 | Morikawa et al. | ............ 358/296 |
| 5,465,156 | A | * | 11/1995 | Arai | ............................. 358/296 |
| 5,539,537 | A | * | 7/1996 | Nozawa | ....................... 358/486 |
| 5,838,883 | A | * | 11/1998 | Pekelman | .................... 358/1.6 |
| 6,219,156 | B1 | * | 4/2001 | Yoshida et al. | .......... 358/426.07 |
| 6,327,051 | B1 | * | 12/2001 | Moro et al. | ................... 358/1.9 |
| 6,480,295 | B1 | * | 11/2002 | Taoda | ......................... 358/1.16 |
| 6,967,731 | B1 | * | 11/2005 | Kizawa | ...................... 358/1.14 |
| 7,034,961 | B2 | * | 4/2006 | Moriura et al. | ............... 358/1.9 |
| 7,145,685 | B2 | * | 12/2006 | Simpson | ..................... 358/1.18 |
| 2002/0080401 | A1 | * | 6/2002 | Abe | .......................... 358/1.15 |

FOREIGN PATENT DOCUMENTS

| JP | 61-288658 |   | 12/1986 |
| JP | 62-247670 A |   | 10/1987 |
| JP | 06-284237 |   | 10/1994 |
| JP | 10-079843 | * | 3/1998 |
| JP | 10079843 | * | 3/1998 |
| JP | 2002-232658 |   | 8/2002 |

* cited by examiner

*Primary Examiner*—Kimberly A Williams
(74) *Attorney, Agent, or Firm*—Sughrue Mion, PLLC

(57) ABSTRACT

Provided is a printing method and the like in which the copying time can be shortened. A printing method for printing a print image on a medium comprises: a step of storing, in a memory area, image data that has been generated by reading an image in an original; a step of determining whether or not the whole image data corresponding to the print image can be stored, in terms of size, in the memory area; and a step of performing printing up to a preset number of sheets based on the image data in the memory area if it is determined that the whole image data can be stored in terms of size.

1 Claim, 18 Drawing Sheets

PRINTING METHOD AND PRINTING APPARATUS

CROSS-REFERENCE TO RELATED APPLICATIONS

The present application claims priority upon Japanese Patent Application No. 2002-290406 filed Oct. 2, 2002, Japanese Patent Application No. 2003-317214 filed Sep. 9, 2003, and Japanese Patent Application No. 2003-317215 filed Sep. 9, 2003, which are herein incorporated by reference.

BACKGROUND OF THE INVENTION

1. Field of the Invention

The present invention relates to printing methods and printing apparatuses.

2. Description of the Related Art

Printers with built-in scanners (referred to as scanner/printer/copier, or SPC, multifunction apparatuses below) are becoming popular in homes nowadays. An SPC multifunction apparatus includes a scanner section for generating image data by scanning an original on an original bed in one direction and reading the image thereof, a memory such as an SDRAM for temporarily storing the above-mentioned image data, and a printer section for printing a print image on paper according to the image data read out from a memory area of the memory. The reading operations with the scanner section and the printing operations with the printer section are performed in parallel to shorten the time for copying. That is, by successively repeating, for the entire area of the original, the concurrent processing of reading a portion of the image of the above-mentioned original and writing and storing the image data into the memory area while concurrently performing printing on the paper according to the above-mentioned image data read out from the above-mentioned memory area, copy processing in a short amount of time is achieved.

However, since the memory size, which is the storage capacity of the above-mentioned memory, is limited, overwriting of image data onto a portion of the memory area in which image data that has already been read out for printing used to exist is permitted when free space runs out during the foregoing copying process. This overwriting may occur particularly in cases where the image data size becomes large, such as when performing high-quality color copying. It is needless to say that only a portion of the image data corresponding to the print image subjected to copying remains in the memory when the copying is complete for the first sheet. Therefore, a re-reading operation needs to be performed with the scanner section every time a copy is to be made, even when making a number of copies of the same original on the original bed. The process of making a number of copies in the above-mentioned SPC multifunction apparatus is set in accordance with the above-mentioned case; that is, it is set so that the re-reading operation is performed every time a copy is to be made, without exception.

However, there are cases in which the whole image data corresponding to the above-mentioned print image can fit into the above-mentioned memory area. For example, there is a high possibility that the whole image data corresponding to the above-mentioned print image can be stored, in terms of size, into the memory area for low-quality monochrome copying since the image data size is small. Further, since low-quality monochrome copying is used comparatively frequently, the time for copying could be shortened and the usability of such copying process would be excellent if it were possible to omit the re-reading operation when making a number of copies at least for monochrome copying.

SUMMARY OF THE INVENTION

The present invention has been made in view of such problems, and an object thereof is to provide a printing method and a printing apparatus that achieves shortening of time for copying.

A main invention is a printing method as follows:

A printing method for printing a print image on a medium comprises:

a step of storing, in a memory area, image data that has been generated by reading an image in an original;

a step of determining whether or not the whole image data corresponding to the print image can be stored, in terms of size, in the memory area; and a step of performing printing up to a preset number of sheets based on the image data in the memory area if it is determined that the whole image data can be stored in terms of size.

Other features of the present invention will be made clear by the accompanying drawings and the description below.

BRIEF DESCRIPTION OF THE DRAWINGS

For more complete understanding of the present invention and the advantages thereof, reference is now made to the following description taken in conjunction with the accompanying drawings.

DETAILED DESCRIPTION OF PREFERRED EMBODIMENTS

Figure 1:
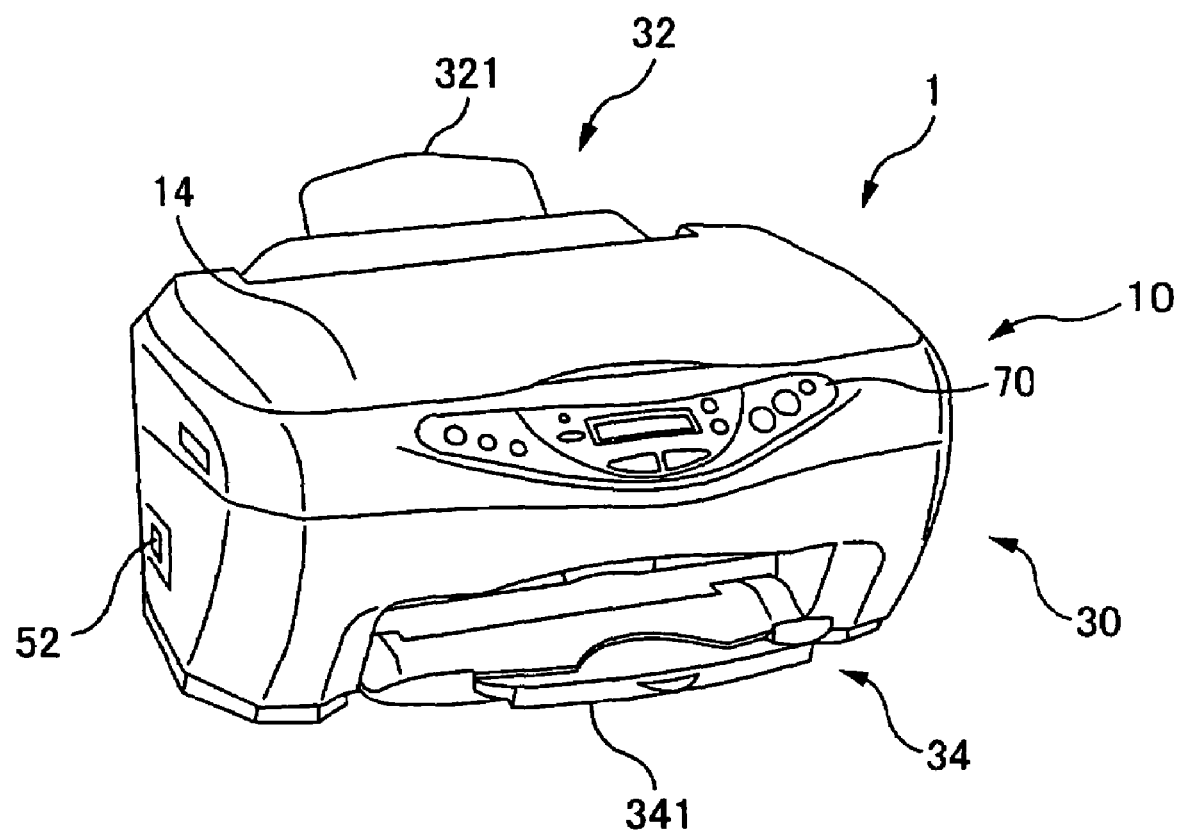
FIG. 1 is a perspective view showing a schematic configuration of a printing apparatus according to the present embodiment.

At least the following matters are made clear by the description in the present specification and the accompanying drawings.

A printing method for printing a print image on a medium comprises:

a step of storing, in a memory area, image data that has been generated by reading an image in an original;

a step of determining whether or not the whole image data corresponding to the print image can be stored, in terms of size, in the memory area; and a step of performing printing up to a preset number of sheets based on the image data in the memory area if it is determined that the whole image data can be stored in terms of size.

According to such a printing method, it is possible to perform printing up to a preset number of sheets using the image data already stored in the memory area if the whole image data corresponding to the above-mentioned print image can be stored, in terms of size, in the above-mentioned memory area. Therefore, it is possible to achieve shortening in the amount of time for copying if the image data can be stored in terms of size.

Further, if it is determined that the whole image data can be stored in terms of size, printing may be performed up to the preset number of sheets based on the image data in the memory area without re-reading the image.

According to such a printing method, it is possible to perform printing up to a preset number of sheets using the image data already stored in the memory area if the whole image data corresponding to the above-mentioned print image can be stored, in terms of size, in the above-mentioned memory area. Therefore, if the image data can be stored in terms of size, it becomes possible to omit the re-reading operation and thereby achieve shortening in the amount of time for copying.

Further, whether or not the whole image data corresponding to the print image can be stored, in terms of size, in the memory area may be determined based on copy-quality-mode information that is defined by either a type of the medium or a copy quality, or a combination thereof.

According to such a printing method, since the determination is made based on the copy-quality-mode information, whether or not the data can be stored, in terms of size, in the memory area is determined when the copy-quality-mode information is entered. Therefore, complicated calculation processes for determination become unnecessary.

Further, whether or not the whole image data corresponding to the print image can be stored, in terms of size, in the memory area may be determined based on a combined mode that is a combination of the copy-quality-mode information, and color/monochrome print mode information that defines which of either one of the following print modes printing is performed by: color printing, or monochrome printing.

According to such a printing method, the color/monochrome print mode information, which has a large effect on the image data size, can also be entered in addition to the above-mentioned copy-quality-mode information, and the above-mentioned determination is made based on a combined mode that is a combination of the above. Therefore, it is possible to make the above-mentioned determination in a finer manner.

Further, the size of the memory area may be set to be equal to or larger than a maximum size of image data that is generated when performing reading according to at least one mode among a plurality of the combined modes.

According to such a printing method, since the above-mentioned memory area is set to be equal to or larger than a maximum size of image data that is generated when performing reading according to the above-mentioned combined mode, the setting can be such that the re-reading operation is not performed for the above-mentioned mode. Therefore, a copy can be made in a short time, as intended, when the user selects this mode.

Further, the image data may be successively stored in the memory area until free space thereof runs out; and if the free space runs out, the image data may be stored in an area where image data that has already been read out used to exist.

According to such a printing method, since the image data is stored in an area where image data that has already been read out used to exist if the free space in the above-mentioned memory area runs out, it is possible to make the size of the memory area size small.

Further, the image data may be CMYK data.

According to such a printing method, it is possible to make the size of the memory area for storing the image data small. More specifically, if the image data is RGB data, the image data size becomes large because the RGB data contains multi-gradation data about the darkness, and therefore a memory area with a large size becomes necessary. On the other hand, since the CMYK data is binary data, it is possible to make the image data size small, and therefore, a small memory area will be sufficient.

Further, if it is determined that the whole image data cannot be stored in terms of size as a result of determining whether or not the whole image data corresponding to the print image can be stored, in terms of size, in the memory area based on the copy-quality-mode information: an area determination for determining an area of the image of the original necessary for printing may be performed based on the image data that has been generated by reading the image in the original; whether or not the whole image data corresponding to the print image can be stored, in terms of size, in the memory area may be determined based on a result of the area determination; and if it is determined that the whole image data can be stored in terms of size, data that has been re-read for the original having been subjected to the area determination may be stored in the memory area based on the result of the area determination, and printing may be performed up to the preset number of sheets based on the image data in the memory area.

According to such a printing method, if it is determined that the whole image data corresponding to the print image can be stored, in terms of size, in the memory area based on the copy-quality-mode information, then copy-printing up to the preset number of sheets is performed using the image data generated by the reading operation and stored in the memory area, without performing the image area determination. On the other hand, if it is determined, based on the copy-quality-mode information, that the whole image data corresponding to the print image cannot be stored, in terms of size, in the memory area, then the area of the original image that is necessary for copy-printing will be determined based on the image data generated according to an image-reading operation. In this case, the area of the actual original image will be determined not according to the original image based on the copy-quality-mode information, but according to a reading operation. Then, from the area determination results, it is determined whether or not the whole image data corresponding to the print image can be stored, in terms of size, in the memory area. If it is then determined that the data can be stored in terms of size, the image data that becomes necessary for copy-printing is stored in the memory area based on the results of the area determination, and therefore, it is possible to perform the copy-printing up to the preset number of sheets in a short amount of time using that image data.

Further, an area determination for determining an area of the image of the original necessary for printing may be performed based on the image data that has been generated by reading the image in the original; whether or not the whole image data corresponding to the print image can be stored, in terms of size, in the memory area may be determined based on a result of the area determination; and if it is determined that the whole image data can be stored in terms of size, data that has been re-read for the original having been subjected to the area determination may be stored in the memory area based on the result of the area determination, and printing may be performed up to the preset number of sheets based on the image data in the memory area.

According to such a printing method, it becomes possible to omit the original-reading operation, and therefore, it is possible to perform the copy-printing process at high speed.

Further, a scan width for which an image-reading section for reading the image in the original is moved may be changed based on the result of the area determination upon re-reading the original that has been subjected to the area determination.

According to such a printing method, since the scan width for which the above-mentioned image-reading section for reading the image in the original is moved is changed, it is possible to shorten the amount of time for reading.

Further, a scan width for which an image-reading section for reading the image in the original is moved may not be changed upon re-reading the original that has been subjected to the area determination; and image data corresponding to the print image may be extracted from the data that has been read for the original having been subjected to the area determination and may be stored in the memory area.

According to such a printing method, based on the results of the above-mentioned area determination, image data corresponding to the image is extracted from the data read by the image-reading section and stored in the memory area. In this case, it is possible to appropriately store the image data necessary for copy-printing in the memory area, and it is possible to effectively use the memory area.

Further, if it is determined that the whole image data cannot be stored in terms of size: operation of reading the original may be performed every time printing is performed; and printing may be performed up to the preset number of sheets using the image data obtained by the reading operation.

According to such a printing method, the same printing process is performed for the copy-printing for the first sheet and the copy-printing for the second sheet and on when the whole image data corresponding to the print image cannot be stored, in terms of size, in the memory area. Therefore, the method will be practically preferable.

Further, the area determination may be performed according to an image-reading operation that is not accompanied with printing.

According to such a printing method, since area determination is performed according to an image-reading operation that is not accompanied with printing, it is possible to perform the reading operation at a resolution necessary for the area determination. Further, since a re-reading operation will be performed for the original that has been subjected to area determination, it is possible to store image data at the print resolution in the memory area. Then, it is possible to perform copy-printing up to the preset number of sheets at high speed using this image data.

Further, the area determination may be performed according to an image-reading operation that is accompanied with printing.

According to such a printing method, since the area determination is performed according to an image-reading operation that is accompanied with printing, both printing and area determination will be achieved with one image-reading operation. Therefore, the method will be more efficient.

Further, a printing apparatus comprises:

an image-reading section for generating image data by reading an image in an original;

a memory area for storing the image data; and a printing section for printing a print image on a medium based on the image data read out from the memory area at an appropriate timing, wherein:

whether or not the whole image data corresponding to the print image can be stored, in terms of size, in the memory area is determined; and if it is determined that the whole image data can be stored in terms of size, printing is performed up to a preset number of sheets based on the image data in the memory area.

According to such a printing apparatus, it is possible to perform printing up to a preset number of sheets using the image data already stored in the memory area if the whole image data corresponding to the above-mentioned print image can be stored, in terms of size, in the above-mentioned memory area. Therefore, it is possible to achieve shortening in the amount of time for copying if the image data can be stored in terms of size.

Schematic Configuration of Printing Apparatus

Figure 2:
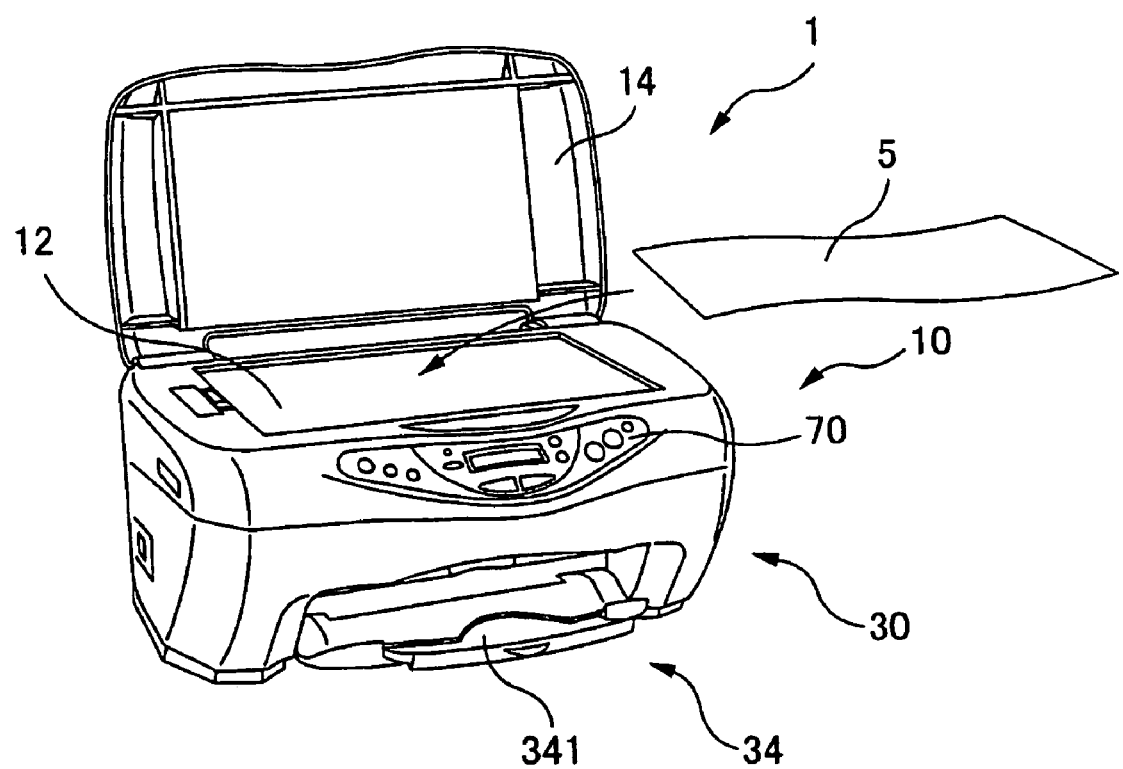
FIG. 2 is a perspective view of the above-mentioned printing apparatus showing a state in which a cover of a scanner section is opened.
Figure 3:
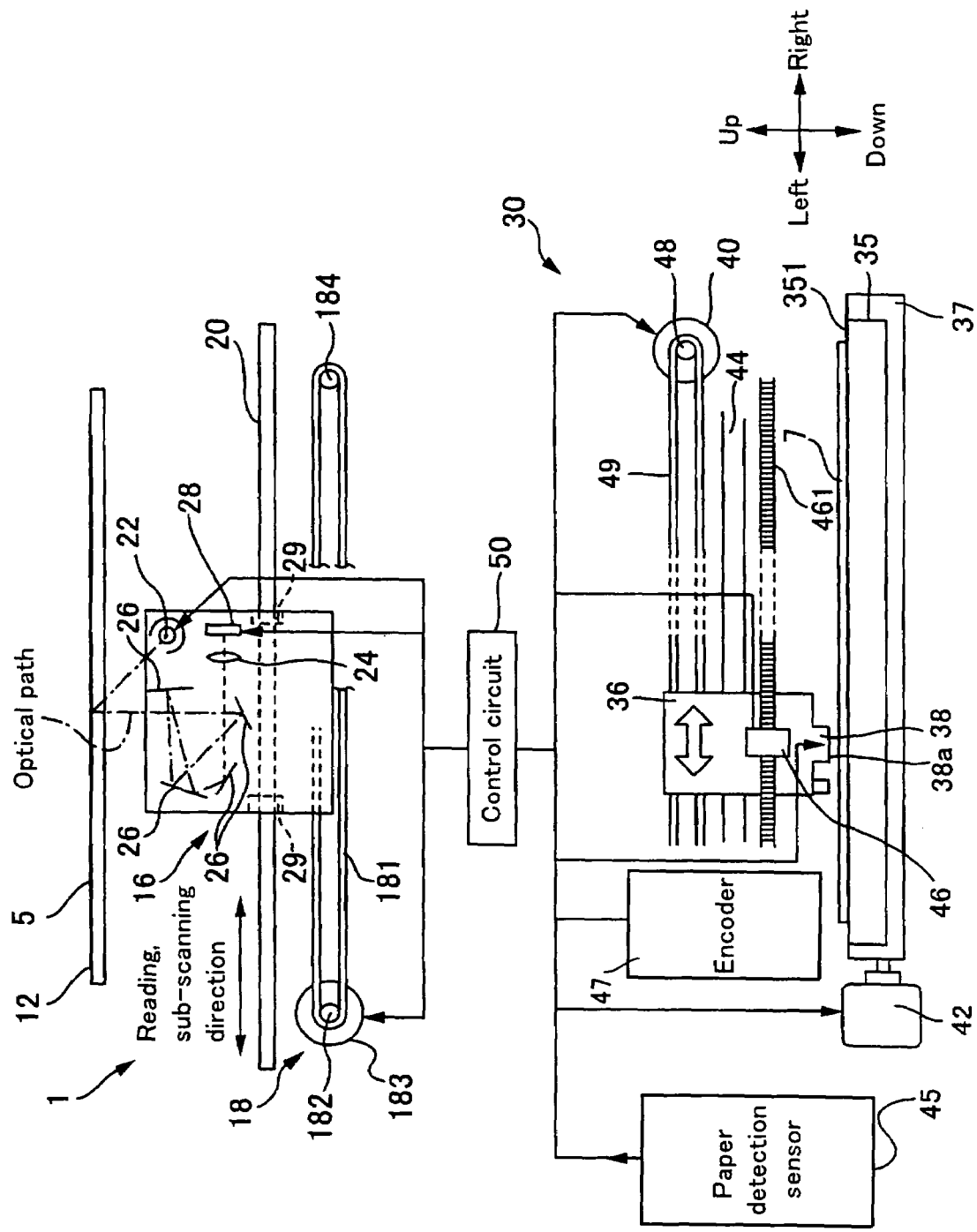
FIG. 3 is an explanatory diagram showing an internal configuration of the printing apparatus.
Figure 4:
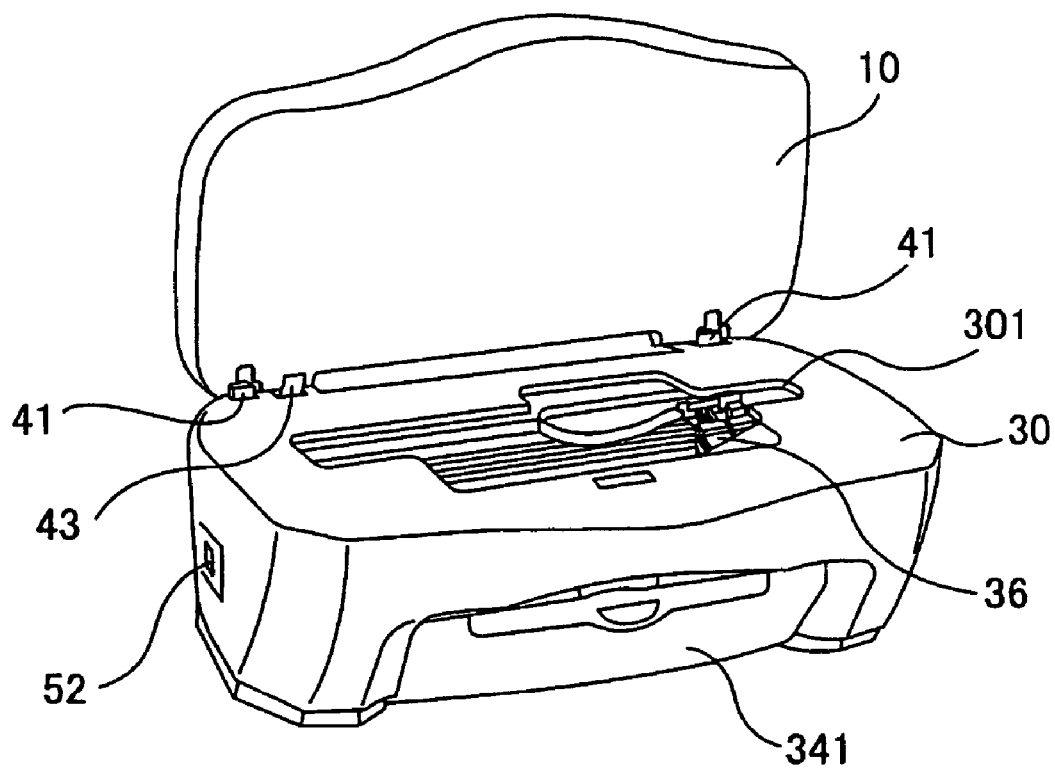
FIG. 4 is a perspective view of the above-mentioned printing apparatus showing a state in which the inside of a printer section is exposed externally.
Figure 5:
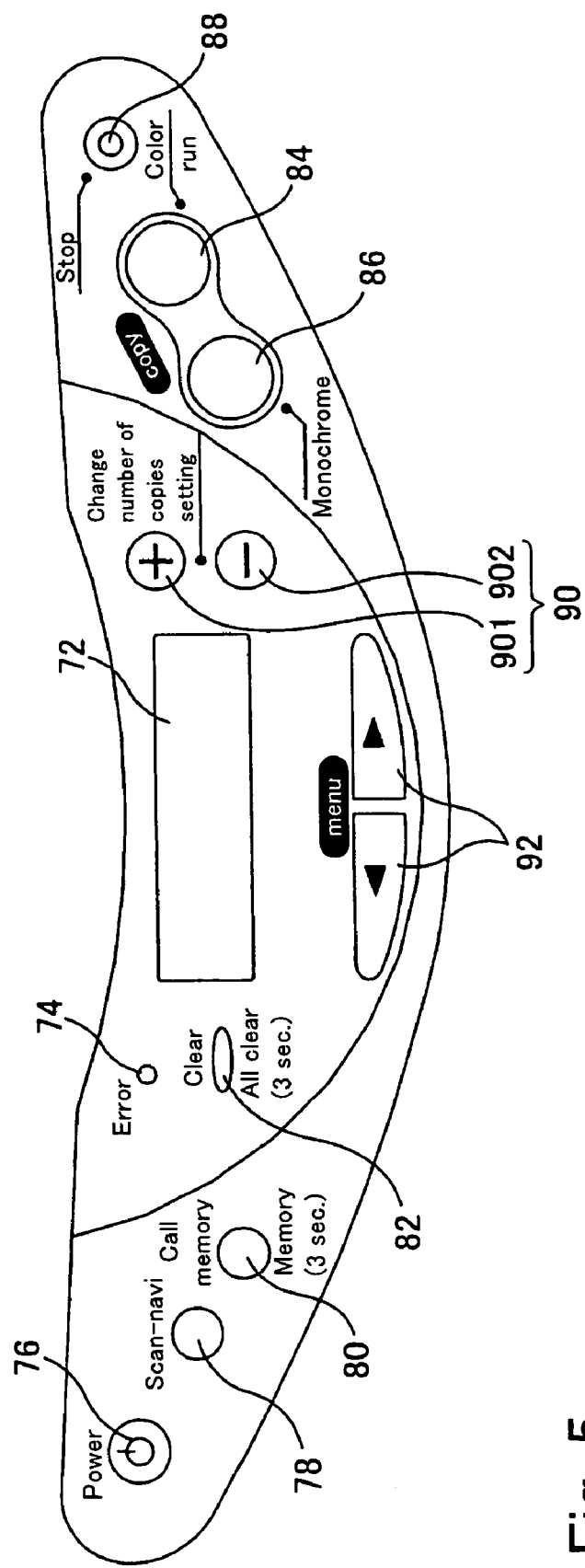
FIG. 5 is a diagram showing an example of a control panel section.

A schematic configuration of a printing apparatus according to the present embodiment is described with reference to FIG. 1 through FIG. 5. FIG. 1 is a perspective view showing a schematic configuration of a printing apparatus according to the present embodiment, FIG. 2 is a perspective view showing a state in which a cover of a scanner section is opened, FIG. 3 is an explanatory diagram showing an internal configuration of the printing apparatus, FIG. 4 is a perspective view showing a state in which the inside of a printer section is exposed externally, and FIG. 5 is a diagram showing an example of a control panel section.

The printing apparatus of the present embodiment is a scanner/printer/copier multifunction apparatus (referred to as an SPC multifunction apparatus below) that has the function as a scanner for inputting an image of an original, the function as a printer for printing a print image on a medium, such as paper, according to image data, and the function as a local copier that prints the image input by the scanner function on paper, for example.

The SPC multifunction apparatus 1 includes a scanner section 10 serving as an image-reading section for reading an image in an original 5 and generating image data, a printer section 30 serving as a printing section for printing a print image on a medium, such as paper, according to the image data, a control circuit 50 that manages control of the entire SPC multifunction apparatus 1, and a control panel section 70. Under control of the control circuit 50, the scanner function, the printer function, and the local-copier function for printing the data input from the scanner section 10 with the printer section 30 are achieved. It should be noted that a memory area for storing the above-mentioned image data is provided in a later-described ASIC-SDRAM 69 that is built into the above-mentioned control circuit 50.

The scanner section 10 is arranged above the printer section 30, and on the upper portion of the scanner section 10 are provided an original bed glass 12 of, for example, the A4 size for placing the original 5 to be read, and an original bed cover 14 that covers the original bed glass 12 when the sheet-like original 5 is being read or when the apparatus is not in use. The original bed cover 14 is formed to be openable and closable and also has the function of pressing the original placed on the original bed glass 12 toward the original bed glass 12 when the cover is closed.

Further, on the rear side of the SPC multifunction apparatus 1 is provided a paper supply section 32 for supplying paper 7 to the printer section 30. A paper discharge section 34 where the printed paper 5 is discharged is provided on the lower side of the front side, and the control panel section 70 is provided above it. The control circuit 50 is built into the above-mentioned printer section 30.

The paper discharge section 34 is provided with a paper discharge tray 341 that is capable of closing the paper discharge opening when the apparatus is not in use. The paper supply section 32 is provided with a paper supply tray 321 that holds cut paper (not shown). It should be noted that in the present embodiment, an example in which the maximum paper size of the above-mentioned cut paper is A4 size is described; however, this is only an example, and the invention is not limited to the above whatsoever.

As shown in FIG. 4, the printer section 30 and the scanner section 10 are coupled by hinge mechanisms 41 at the rear side, and the unitized scanner section 10 is raised from the front side about the turning section of the hinge mechanisms 41. In a state in which the scanner section 10 is raised, the configuration is such that the inside of the printer section 30 is exposed externally from an opening 301 provided on the upper portion of a cover that covers the printer section 30. By making the inside of the printer section 30 be exposed externally in this way, the configuration enables, for example, easy exchange of ink cartridges and so forth and handling of a paper jam.

Figure 10:
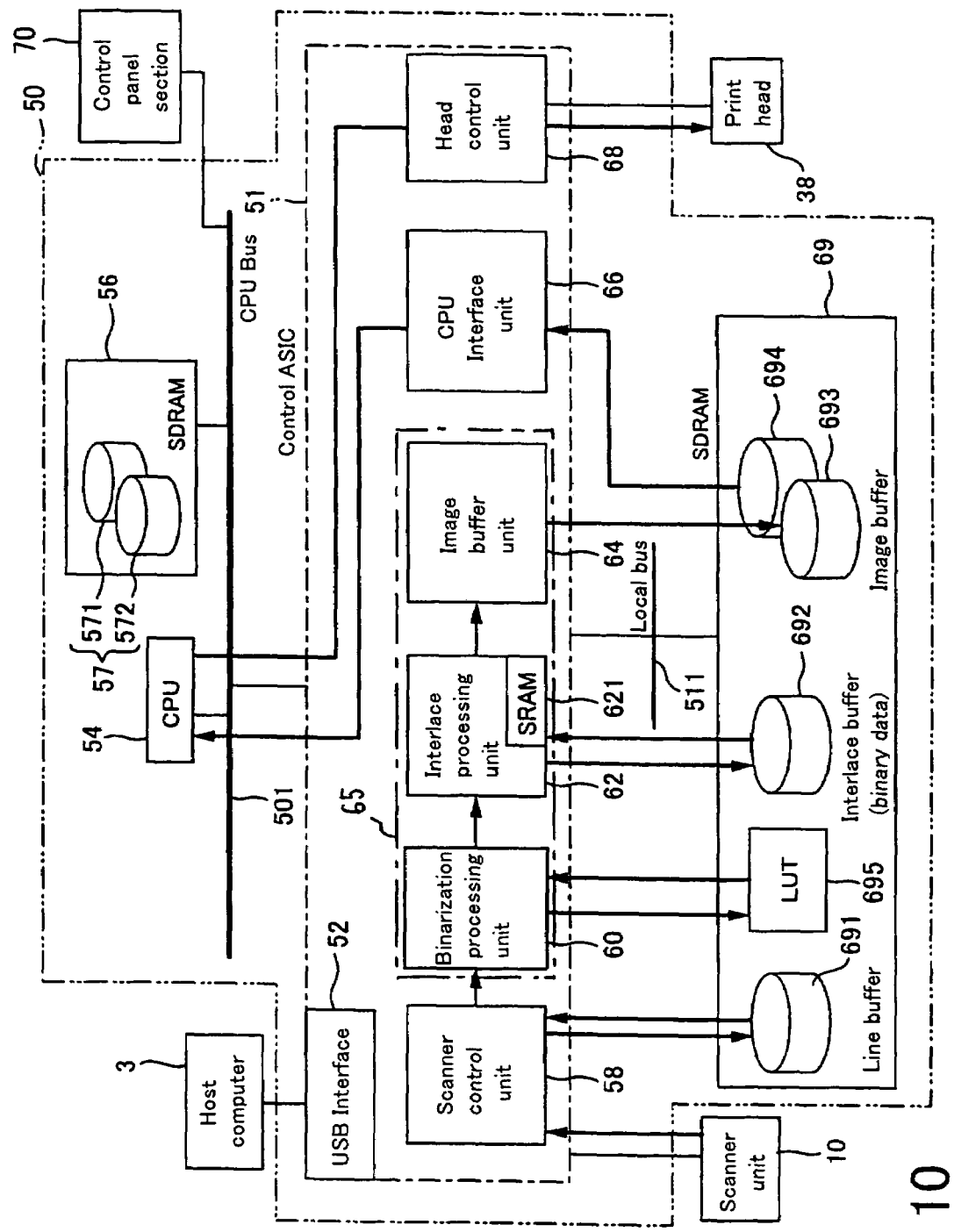
FIG. 10 is a block diagram showing an example of a control circuit.

Further, a power source section for the present SPC multifunction apparatus 1 is provided on the side of the printer section 30, and a power supply cable 43 for supplying power to the scanner section 10 is provided close to the above-mentioned hinge mechanism 41. Furthermore, the SPC multifunction apparatus 1 is provided with a USB interface 52 for enabling images to be output to a host computer 3 by the scanner function as well as the image data sent from the host computer 3 to be output by the printer function (FIG. 10).

Configuration of Control Panel Section 70

As shown in FIG. 5, the control panel section 70 is provided with a liquid crystal display 72, which serves as a display section, at approximately the center thereof and a notification lamp 74. The liquid crystal display 72 is capable of displaying characters and is capable of displaying, for example, setting items, setting states, or operation states using characters. The notification lamp 74 that is made of a red LED and that is located on the side of the liquid crystal display 72 notifies the user of errors by lighting up when an error occurs.

On the left of the liquid crystal display 72 are provided a power button 76, a scan-start button 78, a setting-display button 80, and a clear button 82. The power button 76 is the button for turning the power of the present SPC multifunction apparatus 1 ON and OFF. The scan-start button 78 is the button for causing the operation of the scanner section 10 to read the image in the original 5 to start in a state in which the SPC multifunction apparatus 1 is connected to the host computer 3. The setting-display button 80 is the button for making the liquid crystal display 72 display the setting states for the copying function that have been set by the user. The clear button 82 is the button for resetting the settings for the copying function in order to change the setting items to their default values.

On the right of the liquid crystal display 72 are provided a color copy button 84, a monochrome copy button 86, a stop button 88, and number-of-copies-setting buttons 90.

The color copy button 84 is the button for starting color copying, and the monochrome button 86 is the button for starting monochrome copying. Therefore, these copy buttons 84, 86 serve both as to instructing the copy operation to start and as selecting means for selecting whether the print image to be output is in color or monochrome. Specifically, by pressing either one of the copy buttons 84, 86, color/monochrome print mode information that specifies by which of the print modes—either color printing or monochrome printing—printing is performed is generated, and this information is sent to a CPU 54. It should be noted that the color/monochrome print mode information is used for the process of making a number of copies, which is the characteristic matter of the present invention described later. The stop button 88 is the button for stopping the copying operation that has started.

The number-of-copies-setting buttons 90 are used when performing the above-mentioned process of making a number of copies, and are made up of two buttons 901, 902, each having a "+" or a "−" written on its surface. By pressing the "+" button 901, the setting of the number of sheets increases, and by pressing the "−" button 902, the setting of the number of sheets decreases. With these buttons 90, number-of-copies information is generated according to the setting of the number of sheets, and when the above-mentioned copy buttons 84, 86 are pressed, the number-of-copies information is sent to the CPU 54 along with the above-mentioned color/monochrome print mode information. It should be noted that the number-of-copies information is used for the process of making a number of copies, which is the characteristic matter of the present invention described later.

On the front side of the liquid crystal display 72 are provided menu buttons 92 for changing the setting items displayed on the liquid crystal display 72. The menu buttons 92 are made up of two buttons arranged on the right and left, each having a rightward arrow or a leftward arrow written thereon. Every time either the right or left one of the menu buttons 92 is pressed, the displayed setting items sequentially change according to a predetermined order, and after all the items have been displayed once, the first setting item is displayed. The left and right arrows are for changing the order in which the setting items are displayed, and each button 92 allows the setting items to be displayed in the order opposite to the displaying order for when the other button is pressed.

With these menu buttons 92, it is possible to set a copy quality mode for each type of paper. The copy quality mode mainly relates to the copy image quality; that is, by selecting the copy quality mode, the read resolution for when the image is read by the scanner section 10 and the print resolution for when printing is performed by the printer section 30 are determined.

Figure 11:
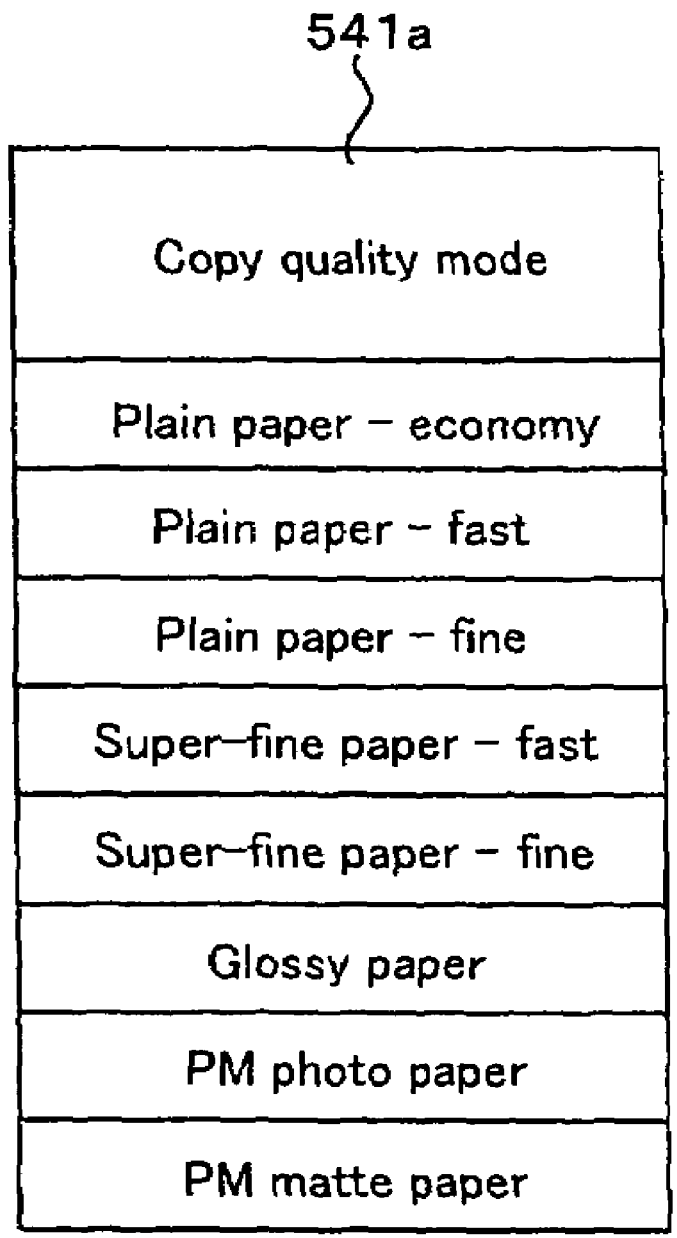
FIG. 11 is an explanatory diagram showing copy quality modes.

FIG. 11 exemplifies the copy quality modes provided for the SPC multifunction apparatus 1 of the present embodiment. For example, as for plain paper, three types of copy quality modes, "economy; fast; fine", can be selected, and as for super-fine paper, two types of modes, "fast; fine" can be selected. Further, as for glossy paper, PM photo paper, and PM matte paper, which usually require higher image quality than the plain paper etc., one copy quality mode is provided for each. The user appropriately operates the menu buttons 92 while looking at the liquid crystal display 72 to input the copy quality mode. Then, copy-quality-mode information generated according to this input is sent to the CPU 54 along with the color/monochrome print mode information and so forth described above. It should be noted that the copy-quality-mode information is used for the process of making a number of copies, which is the characteristic matter of the present invention described later.

Configuration of Scanner Section 10

The scanner section 10 includes the original bed glass 12 on which the original 5 is placed, the pressing cover 14 for pressing the surface to be read of the original 5, which is placed on the original bed glass 12, toward the original bed glass 12, a reading carriage 16 that is opposed to the original across the original bed glass 12 and that scans along the original 5 while maintaining a constant distance from the original 5, drive means 18 for making the reading carriage 16 scan, and a restriction guide 20 for making the reading carriage 16 scan in a stable state.

The reading carriage 16 includes an exposure lamp 22 serving as a light source for illuminating the original 5 across the original bed glass 12, a lens 24 for concentrating the light reflected from the original 5, four mirrors 26 for guiding the light reflected from the original 5 to the lens 24, a CCD sensor 28 for receiving the reflected light that has passed through the lens, and guide receiving sections 29 that engage with the above-mentioned restriction guide 20.

The CCD sensor 28 includes three linear sensors in which photodiodes for converting light signals into electric signals are arranged in rows, and these three linear sensors are arranged parallel to each other. The CCD sensor 28 includes three, not-shown filters for R (red), G (green), and B (blue); a filter for a different color is provided for each linear sensor. Each linear sensor detects the light component corresponding to the color of the filter. For example, the linear sensor with the R filter detects the intensity of the red light component. The three linear sensors are arranged in a direction (referred to as the main-scanning direction below) that is approximately orthogonal to the scanning direction of the reading carriage 16 (referred to as the sub-scanning direction below).

The reflected light from the original 5 is reflected by the four mirrors 26, passes through the lens 24, and reaches the CCD sensor 28; however, since the three linear sensors are arranged in parallel, the positions on the original from which the reflected light that forms an image on each linear sensor at the same time was reflected are misaligned, in the sub-scanning direction, by an amount equal to the width of each linear sensor. Therefore, a scanner control unit 58 (FIG. 10) of the control circuit 50 performs interline correction processing for correcting this misalignment. The interline correction processing is described later.

The above-mentioned restriction guide 20 is provided in the sub-scanning direction and is formed of a cylindrical material made of stainless steel. The restriction guide 20 passes through the two guide receiving sections 29 that are provided on the reading carriage 16 and that are formed of thrust bearings. By widening the distance, in the sub-scanning direction, between the two guide receiving sections 29 provided on the reading carriage 16, it becomes possible to cause the reading carriage 16 to scan stably.

The drive means 18 includes an annular timing belt 181 fixed to the reading carriage 16, a pulse motor 183 that has a pulley 182 engaging with the timing belt 181 and that is arranged on one end in the sub-scanning direction, and an idler pulley 184 that is arranged on the other end and that applies tension force to the timing belt 181. The pulse motor 184 is driven by the scanner control unit 58 (FIG. 10) of the control circuit 50; according to the scan speed of the reading carriage 16 which is changed according to the speed of the pulse motor 183, it becomes possible to enlarge or reduce, in the sub-scanning direction, the image that has been read.

The scanner section 10 causes the reading carriage 16 to move along the original 5 while illuminating the original 5 with the light of the exposure lamp 22 and forming an image on the CCD sensor 28 with the reflected light. At this time, by reading-in, according to a predetermined cycle, the amounts of light received by the CCD sensor 28 as values in voltage, the image for the distance for which the reading carriage 16 moved during one cycle is taken in as data for one line of an image to be output. At this time, three kinds of data—the R component, the G component, and the B component—are taken in as data for one line.

Configuration of Printer Section 30

The printer section 30 is configured to be able to output color images and adopts the inkjet method in which images are formed by ejecting color inks of, for example, four colors—cyan (C), magenta (M), yellow (Y), and black (K)—onto paper to form dots. It should be noted that, other than the above-mentioned four colors, light cyan (pale cyan, LC), light magenta (pale magenta, LM), and dark yellow (dim yellow, DY) may be used as the color inks.

Figure 6:
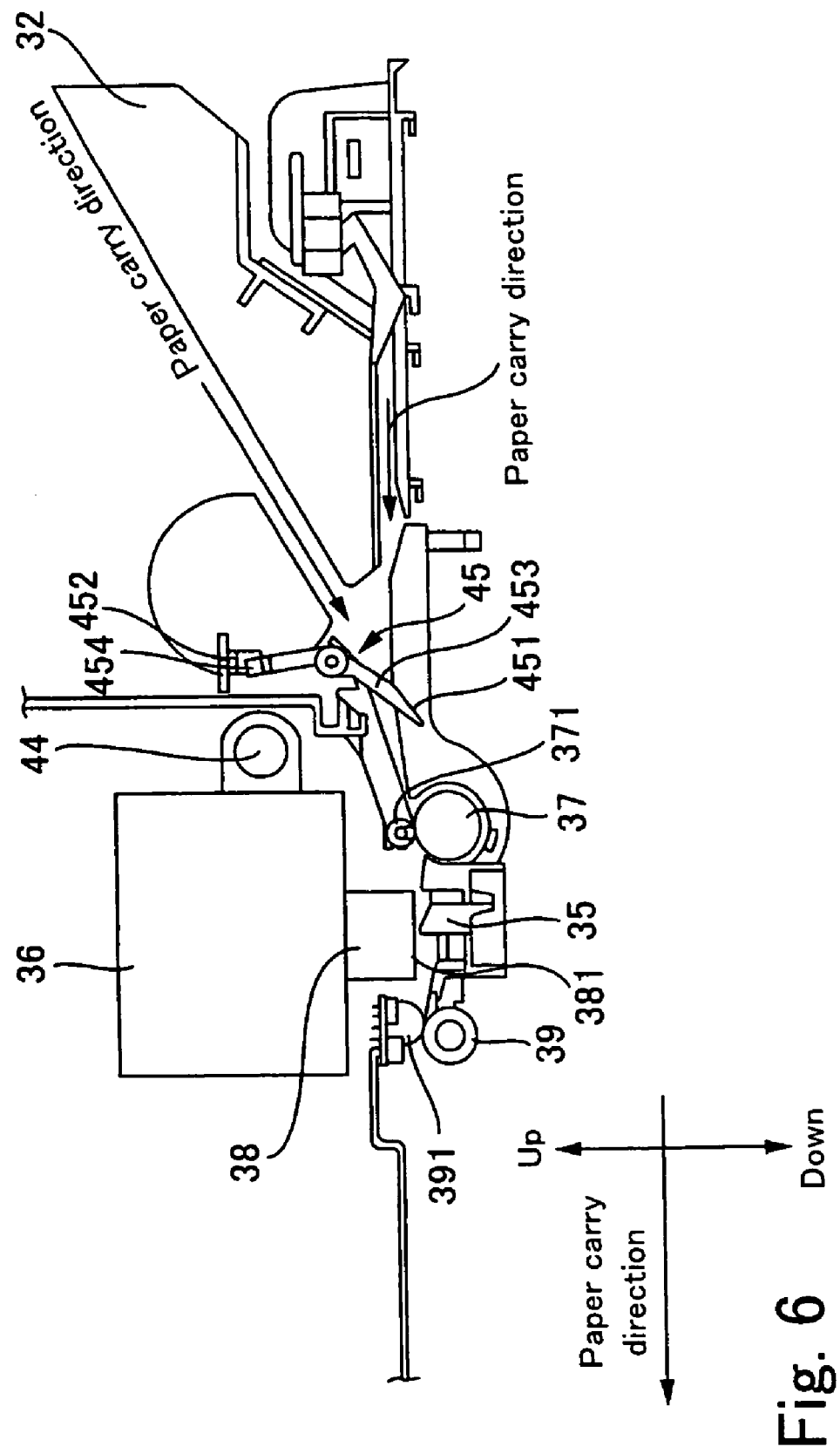
FIG. 6 is an explanatory diagram showing an arrangement of the surroundings of a print head.
Figure 7:
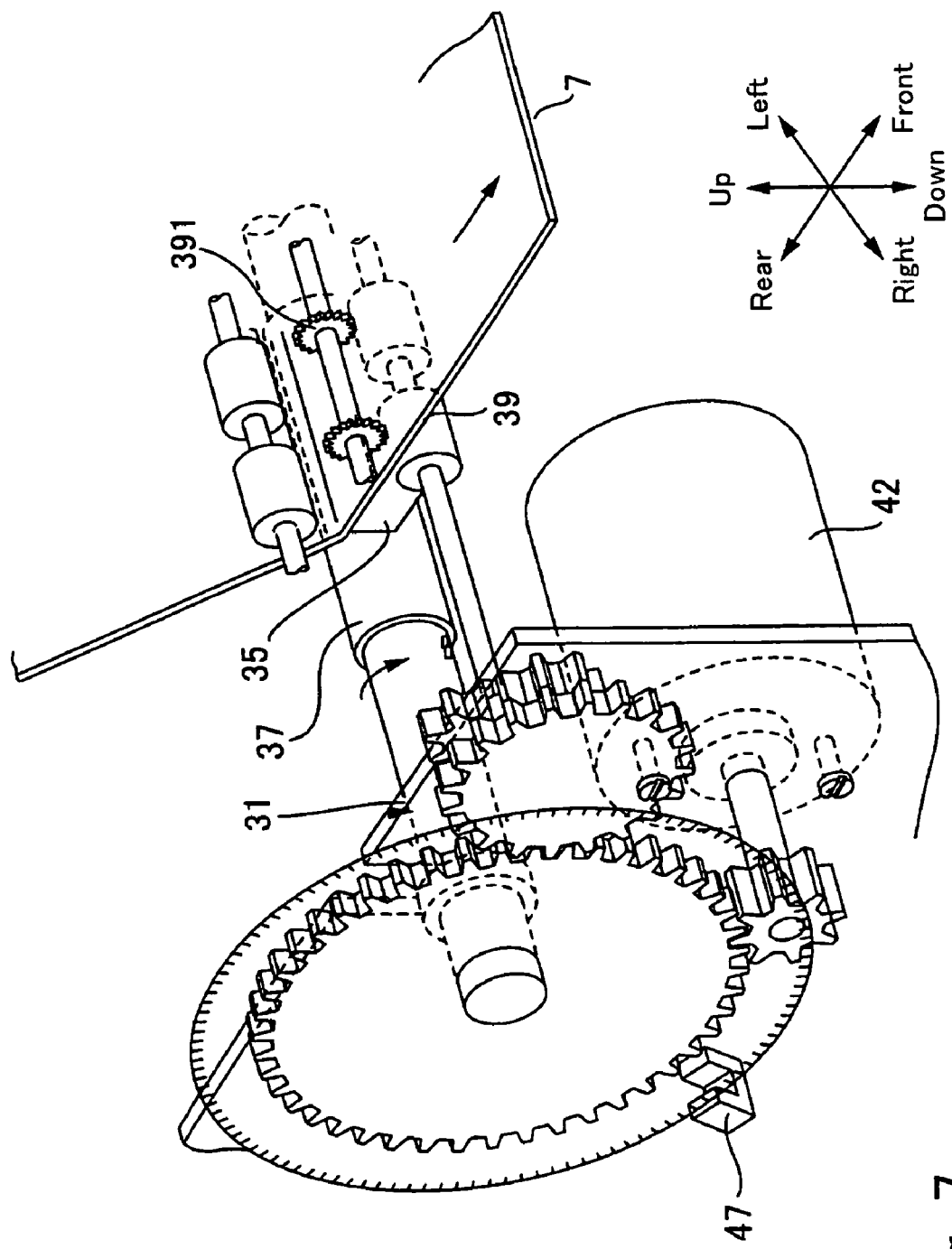
FIG. 7 is an explanatory diagram for illustrating a drive section of a paper carry mechanism.

Next, with reference to FIG. 3, FIG. 6, and FIG. 7, the printer section 30 is described. FIG. 6 is an explanatory diagram showing the arrangement of the surroundings of the print head, and FIG. 7 is an explanatory diagram for illustrating a drive section of a paper carry mechanism.

As shown in the figures, the printer section 30 has a mechanism for ejecting ink and forming dots by driving a print head 38 mounted on a writing carriage 36, a mechanism for causing the writing carriage 36 to move back and forth in a direction orthogonal to the direction in which the paper 7 is carried by a carriage motor 40, and a mechanism for carrying the paper 7 supplied from the paper supply tray 321 (see FIG. 1) by the paper feed motor (referred to also as a PF motor below) 42.

The mechanism for ejecting ink and forming dots includes the print head 38 that has a plurality of nozzles serving as ink ejecting sections, and causes predetermined nozzles to eject ink according to print command signals. The plurality of nozzles form rows in the bottom surface 381 of the print head 38 in the carry direction of the paper 7, and the plurality of rows are arranged in the direction orthogonal to the carry direction of the paper 7. Details on the print head 38 and the nozzle arrangement will be described later. The print head 38 includes a 16-bit memory associated with each of the nozzles; data is transferred from a head control unit 68 (FIG. 10), which is described later, to each nozzle in 16-bit units.

The mechanism for causing the writing carriage 36 to move back and forth includes the carriage motor (referred to also as a CR motor below) 40 for driving the writing carriage 36, a slide shaft 44 that is provided in the direction orthogonal to the carry direction of the paper 7 and that slidably holds the writing carriage 36, a linear encoder 46 fixed to the writing carriage 36, a linear encoder code plate 461 in which slits are formed at predetermined intervals, a pulley 48 that is attached to a rotating shaft of the carriage motor 40, and a timing belt 49 that is driven by the pulley 48.

The print head 38 and a cartridge mounting section integrally provided with the print head 38 are fixed to the writing carriage 36, and ink cartridges containing inks of black (K), cyan (C), magenta (M), yellow (Y) and so forth are mounted on the cartridge mounting section.

The mechanism that carries the paper 7 supplied from the paper supply tray 321 has a platen 35 that is arranged opposed to the above-mentioned print head 38 and that serves as a guiding member for guiding the paper 7 so that distance between the paper 7 and the print head 38 is appropriate, a carry roller 37 that is provided upstream from the platen 35 in the carry direction of the paper 7 and that carries the supplied paper 7 to the platen 35, a paper discharge roller 39 that is provided downstream from the platen 35 in the carry direction of the paper 7 and that is for carrying and discharging the paper 7 that has disengaged from the carry roller 37, the PF motor 42 for driving the carry roller 37 and the paper discharge roller 39, a rotary encoder 47 for detecting the amount for which the paper 7 has been carried, and a paper detection sensor 45 for detecting the presence of the paper 7 and the front end and the rear end of the paper 7.

The carry roller 37 is provided underneath the carry path of the paper 7, and a driven roller 371 for holding the paper 7 is provided above and in opposition to the carry roller 37. The paper discharge roller 39 is also provided underneath the carry path of the paper 7, and a driven roller 391 for holding the paper 7 is provided above and in opposition to the paper discharge roller 39. The carry roller 37 and the paper discharge roller 39 are linked through a gear train 31, and are made to rotate through transmission of the rotation of the PF motor 42; the speed at which both rollers 37, 39 carry the paper 7 is the same.

In opposition to the bottom surface 381 of the print head 38, that is, the surface with the nozzles, the platen 35 has a guide surface 351 that guides the paper 7 through contact therewith.

The paper detection sensor 45 is arranged upstream from the carry roller 37 in the carry direction, and includes a lever 451 that has an axis of swinging in a position higher than the carry path of the paper 7, and a transmission type optical sensor 452 that is provided above the lever and that has a light emitting section and a light receiving section. The lever 451 is arranged so that it hangs down into the carry path under its own weight, and includes an actuating section 453 that is made to swing by the paper 7 supplied from the paper supply tray 321 and a light-blocking section 454 that is located on the opposite side of the actuating section 453 across the axis of swinging and that is arranged to pass between the light emitting section and the light receiving section. In the paper detection sensor 45, when the lever 451 is pushed by the supplied paper 7 and the paper 7 reaches a predetermined position, the light-blocking section 454 blocks the light that has been emitted from the light emitting section, and thereby, it is detected that the paper 7 has reached the predetermined position. Then, when the paper 7 is carried by the carry roller 7 and the rear end of the paper 7 passes by, the lever 451 hangs down under its own weight, the light-blocking section 454 comes out from between the light emitting section and the light receiving section so that the light from the light emitting section is received by the light receiving section, and it is detected that the rear end of the paper 7 reached the predetermined position. In this way, it is detected that the paper 7 is present at least in the carry path while the light-blocking section 454 is blocking the light from the light emitting section.

Regarding the Configuration of the Nozzles

Figure 8:
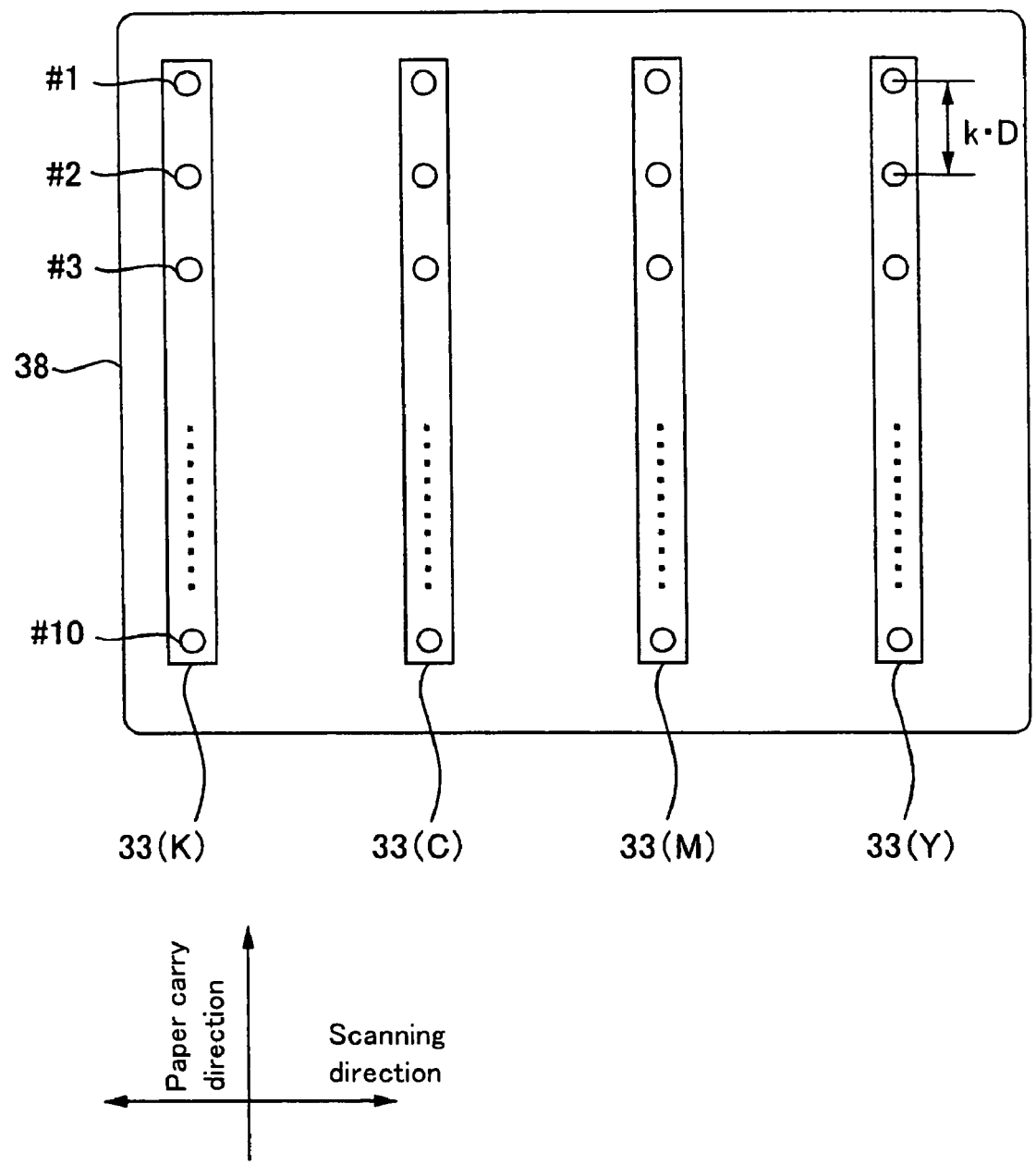
FIG. 8 is an explanatory diagram showing an arrangement of nozzles in the bottom surface of the print head.

FIG. 8 is an explanatory diagram showing the arrangement of nozzles in the bottom surface 381 of the print head 38. In the bottom surface 381 of the print head 38 are formed a black ink nozzle row 33(K), a cyan ink nozzle row 33(C), a magenta ink nozzle row 33(M), and a yellow ink nozzle row 33(Y). Each nozzle row 33 has a plurality of nozzles (ten in the present embodiment) that are the ejection openings for ejecting ink of each color.

The plurality of nozzles in each nozzle row 33 are aligned in the paper carry direction at regular intervals (nozzle pitch: k·D). Here, D is the minimum dot pitch in the paper carry direction (that is, it is the distance between dots formed on the paper 7 at the highest resolution), and for example, when the resolution is 720 dpi, D is 1/720 inch (approximately 35.3 μm). Further, k is an integer of 1 or more.

Further, as for the nozzles in each nozzle row 33, nozzles located further downstream have smaller numbers attached to them; each of the nozzles is referred to as the first nozzle N1 through the tenth nozzle N10, and the nozzles are aligned with the nozzles in the adjacent nozzle row 33 regarding their positions in the paper carry direction. Each nozzle is provided with a piezo element (not shown) as an actuation element for actuating each nozzle to make it eject ink droplets.

It should be noted that, during printing, the paper 7 is intermittently carried by the carry roller 37 and the paper discharge roller 39 by a predetermined carry amount F, and during this intermittent carrying, the writing carriage 36 is moved in the scanning direction and ink droplets are ejected from each of the nozzles.

Actuating the Print Head

Figure 9:
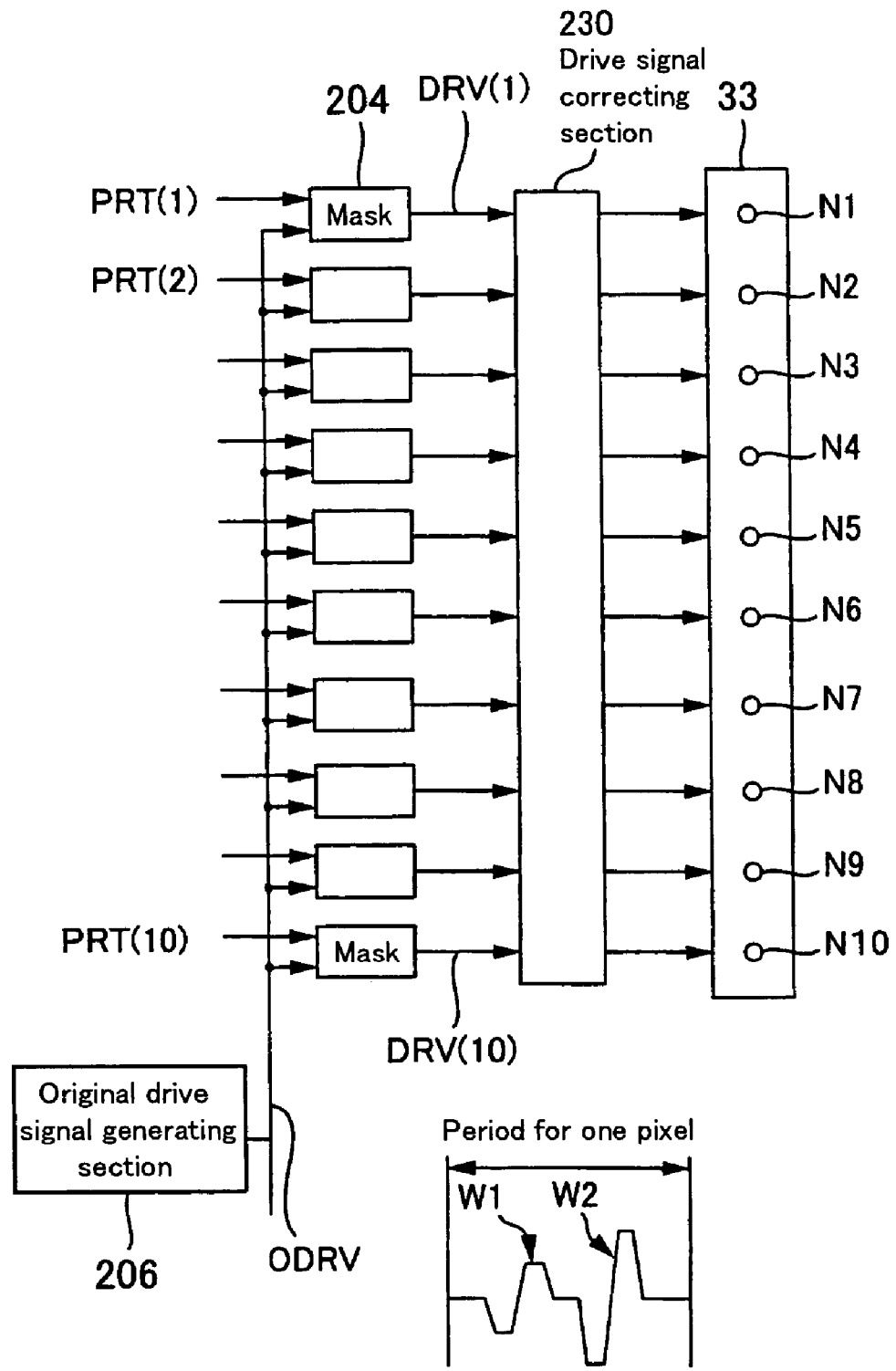
FIG. 9 is a block diagram showing a configuration of a drive signal generating section provided in a head control unit.

Next, the actuation of the print head 38 is described below with reference to FIG. 9. FIG. 9 is a block diagram showing the configuration of a drive signal generating section provided in the head control unit 68 (FIG. 10).

In FIG. 9, the drive signal generating section includes a plurality of mask circuits 204, an original drive signal generating section 206, and a drive signal correcting section 230. The mask circuits 204 are provided corresponding to each of the plurality of piezo elements for actuating each of the nozzles N1 through N10 of the print head 38. Note that in FIG. 9, the number in parentheses attached to the end of each signal name indicates the number of the nozzle to which the signal is supplied. The original drive signal generating section 206 generates original drive signals ODRV used in common among the nozzles N1 through N10. The original drive signal ODRV is a signal that includes two pulses—a first pulse W1 and a second pulse W2—during the main scan period for one pixel. The drive signal correcting section 230 performs correction by shifting, either forward or backward for the whole return pass, the timing of the drive signal waveform that has been shaped by each mask circuit 204. By correcting the timing of the drive signal waveform, the misalignment between the positions at which the ink droplets land during the forward pass and the return pass is corrected; that is, the misalignment between the positions at which the dots are formed during the forward pass and the return pass is corrected.

As shown in FIG. 9, input serial print signals PRT(i) are input to the mask circuits 204 along with the original drive signal ODRV that is output from the original drive signal generating section 206. The serial print signal PRT(i) is a serial signal made of two bits per pixel, and each bit corresponds to the first pulse W1 and the second pulse W2, respectively.

Each mask circuit 204 is a gate for masking the original drive signal ODRV according to the level of the serial print signal PRT(i). That is, if the serial print signal PRT(i) is at level 1, the mask circuit 204 lets the corresponding pulse of the original drive signal ODRV pass right through so that the pulse is supplied to the piezo element as a drive signal DRV, whereas if the serial print signal PRT(i) is at level 0, the mask circuit 204 cuts off the corresponding pulse of the original drive signal ODRV.

Internal Structure of the Control Circuit 50

FIG. 10 is a block diagram showing an example of a control circuit 50.

In the control circuit 50 of the SPC multifunction apparatus 1, the CPU 54 that manages the control over the entire SPC multifunction apparatus 1, the control ASIC 51 that manages the control over the scanner function, the printer function, and the local copier function, an SDRAM 56 in which data is directly readable and writable from the CPU 54, and the control panel section 70 are connected via a bus. The scanner unit 10, the print head 38, the ASIC-SDRAM 69 in which data is directly readable and writable from the control ASIC 51, and so forth, are connected to the control ASIC 51.

The control ASIC 51 includes the scanner control unit 58, a binarization processing unit 60, an interlace processing unit 62, an image buffer unit 64, a CPU interface unit (referred to as a CPUIF unit below) 66, the head control unit 68, the USB interface (referred to as a USBIF below) 52 serving as input/output means for the external host computer 3, and drivers for each of the motors, lamps, and so forth, that the scanner section 10 and the printer section 30 comprise. It should be noted that the above-mentioned binarization processing unit 60, the interlace processing unit 62, and the image buffer unit 64 form an image processing circuit 65.

Figure 12:
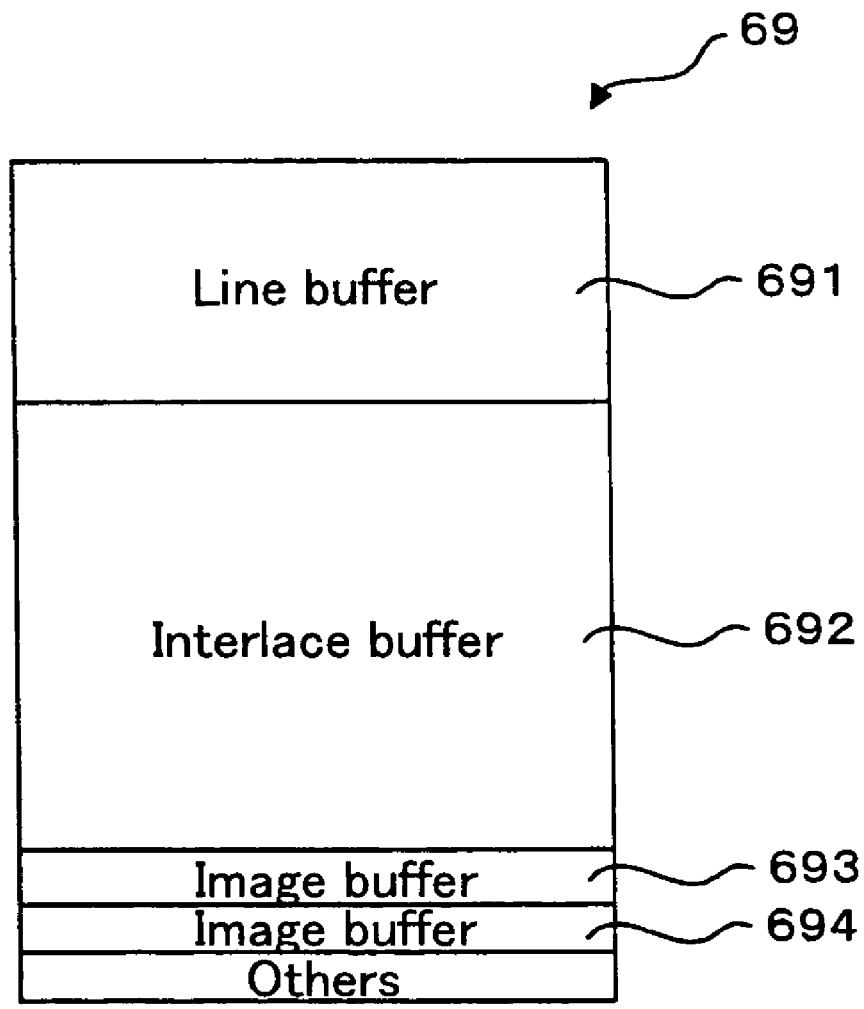
FIG. 12 is a memory map of a control-ASIC-SDRAM.

A line buffer 691, an interlace buffer 692, and an image buffer 693 are allocated to the memory area of the control-ASIC-SDRAM 69. FIG. 12 shows a memory map of the control-ASIC-SDRAM; the allocated memory size is in the order of the interlace buffer 692, the line buffer 691, and the image buffer 693, in decreasing order of size. By the way, the memory size of the interlace buffer 692, to which the largest memory area is allocated, is 12 [Mbyte].

It should be noted that, in order to achieve increased data transfer rate, so-called burst transmission, in which the data transfer unit is 64 bit, is adopted between the control ASIC 51 and the ASIC-SDRAM 69.

The scanner control unit 58 has the function of executing control over the exposure lamp 22, the CCD sensor 28, the pulse motor 183 serving as a reading carriage drive motor, and so forth, of the scanner section 10, and the function of sending the RGB data read in via the CCD sensor 28 to the binarization processing unit 60 via the line buffer 691. It should be noted that when functioning as a copier as described later, the scanner control unit 58 also performs, for example, resolution conversion processing for converting the read resolution of the RGB data into the print resolution for printing with the printer section 30; this will be described later.

The binarization processing unit 60 has the function of converting the multi-gradation RGB data, which has been sent, into CMYK binary data and sending the data to the interlace processing unit 62.

The interlace processing unit 62 has the function of generating overlap-printing-compliant data (referred to as OL-compliant data below) by dividing the CMYK data for one raster line into data for printing per each scan movement of the writing carriage 36, in order to perform so-called overlapped printing in which one raster line (a line in the main-scanning direction in a print image) is printed with several number of times of scan movements of the writing carriage 36. The generated OL-compliant data is stored in the interlace buffer 692 of the ASIC-SDRAM 69.

Further, the interlace processing unit 62 has the function of reading out the data stored in the interlace buffer 692 onto an SRAM 621 in the interlace processing unit 62 in units of predetermined size, rearranging the data on the SRAM 621 so as to associate the data with the nozzle arrangement, and sending the data to the image buffer unit 64.

The image buffer unit 64 has the function of generating, from the data sent from the interlace processing unit 62, head-drive data for causing each nozzle to eject ink per each scan movement of the writing carriage 36.

The CPUIF unit 66 has the function of enabling the CPU 54 to access the control-ASIC-SDRAM 69 connected to the control ASIC 51. In the present control circuit 50, the unit 66 is used when actuating the head control unit 68 according to the head-drive data generated by the image buffer unit 64.

The head control unit 68 has the function of actuating the print head 38 according to the head-drive data under control of the CPU 54 to make the nozzles eject ink.

<<<Data Flow in Each Function >>>

When Functioning as a Scanner

A command signal instructing to read an image with the scanner unit 10 and read-information data such as the read resolution and the read area are sent from the host computer 3 connected to the USBIF 52 of the control ASIC 51 to the control circuit 50. In the control circuit 50, the scanner control unit 58 is controlled by the CPU 54 according to the image-read command signal and the read-information data, and reading of the original 5 with the scanner unit 10 is started. At this time, in the scanner control unit 58, a lamp drive unit, a CCD drive unit, a reading carriage scan drive unit, and so forth, are actuated, and RGB data is read from the CCD sensor 28 according to a predetermined cycle. The RGB data having been read in is temporarily stored in the line buffer 691 allocated to the ASIC-SDRAM 69, subjected to interline correction processing for each R, G, and B data, and sent to the host computer 3 via the USBIF 52. Interline correction processing is a process for correcting the misalignment among the reading positions for the R, G, and B linear sensors, which occurs due to the structure of the scanner section 10. Describing in detail, the CCD sensor 28 that the scanner unit 10 has is a color sensor and has one line of linear sensor each for the three colors, R (red), G (green), and B (blue). Since these three linear sensors are arranged parallel to each other in the scanning direction of the reading carriage 16, the reflected light, which was illuminated on the same line in the original 5, cannot be received at the same time. That is, when the reflected light, which was illuminated on the same line in the original 5, is received by each of the linear sensors, there will be a time lag. Therefore, the process is for synchronizing the pieces of data that are sent delayed by a delay time that occurs due to the arrangement of the linear sensors.

When Functioning as a Printer

When functioning as a printer, the image data to be printed is input through the USBIF 52 after being converted, in a printer driver of the host computer 3 connected to the USBIF 52 of the control ASIC 51, into head-drive data that can be printed by the printer section 30 of the SPC multifunction apparatus 1. The head-drive data is data that provides signals for actuating the print head 38; for example, when printing according to the interlace mode, the head-drive data is made by extracting raster data that corresponds to the print resolution and the pitch and number of nozzles of each nozzle row 33 in the writing carriage 36, and rearranging the raster data in the order to be printed per each scan movement of the writing carriage 36.

The head-drive data is stored in an image buffer 57 that is allocated to the SDRAM 56 which is directly readable from the CPU 54. The image buffer 57 has two memory areas each having a capacity capable of storing head-drive data for printing with one scan movement of the writing carriage 36. When data for one scan movement is written into one image buffer 571, the data is transferred to the head control unit 68. When the image data in one image buffer 571 is transferred to the head control unit 68, head-drive data for printing upon the next scan movement is stored in the other image buffer 572. Then, when the data for one scan movement is written into the other image buffer 572, the data is transferred to the head control unit 68, and image data is written into the above-mentioned first image buffer 571. In this way, printing is performed by writing and reading the head-drive data alternately using two image buffers 571, 572 and actuating the print head 38 with the head control unit 68.

When Functioning as a Copier

Next, the data flow for when functioning as a copier is described.

When the above-mentioned copy quality mode, for example, is input through the control panel section 70 and the copy buttons 84, 86 are pressed, a copy start command is sent from the CPU 54 to the control ASIC 51. Then, the scanner control unit 58 of the control ASIC 51 makes the scanner unit 10 read the image in the original at a predetermined read resolution that corresponds to the copy quality mode information according to the above-mentioned input. The data having been read by the scanner unit 10 is then taken into the line buffer 691 via the scanner control unit 58. The RGB data taken into the line buffer 691 is successively subjected to the above-mentioned RGB interline correction processing, and the RGB data corresponding to the same line are sent from the scanner control unit 58 to the binarization processing unit 60.

Further, in parallel to the above, the scanner control unit 58 also performs resolution conversion processing for converting the read resolution [dpi] of the above-mentioned RGB data into the print resolution [dpi] for printing with the printer section 30. That is, if the read resolution of the RGB data is lower than the print resolution corresponding to the above-mentioned copy-quality-mode information, new data is generated between adjacent pieces of data through, for example, linear interpolation; conversely, if the read resolution is higher than the print resolution, data is thinned out according to a predetermined rate, for example, to make the resolution of the RGB data match the print resolution. It should be noted that a similar process is performed upon enlarged or reduced copying. That is, the linear interpolation or thinning-out processing is performed so that the resolution [dpi] of the above-mentioned RGB data after enlargement or reduction matches the print resolution. Further, particularly for enlarged copying, a process of extracting only the RGB data within the maximum print area that can be printed by the printer section 30 is performed. As described above, the scanner control unit 58 makes the resolution of the RGB data match the print resolution, and also extracts the RGB data so that the print area size thereof will be equal to or less than the maximum print area of the above-mentioned printer section 30. Then the unit 58 sends the data to the binarization processing unit 60.

Next, the RGB data sent into the binarization processing unit 60 is subjected to halftone processing, is then converted into binary data for each of the CMYK colors with reference to a lookup table (LUT) 695 stored in the control-ASIC-SDRAM 69, and sent into the interlace processing unit 62.

As for the binary CMYK data sent into the interlace processing unit 62, the whole data for each raster line is divided into pieces of data to be printed per every scan movement of the writing carriage 36 according to the designated interlace mode. For example, when forming one raster line with two scan movements of the writing carriage 36, the whole data for each raster line is divided into data for forming the odd-numbered dots, counted from the end of the raster line, and data for forming the even-numbered dots to generate the OL-compliant data. The OL-compliant data is burst transmitted to the interlace buffer 692 and stored there.

The interlace processing unit 62 reads out the data stored in the interlace buffer 692 in units of predetermined size, and burst transmits the data to the SRAM 621 in the interlace processing unit 62. At this time, the OL-compliant data is read out from the interlace buffer 692 in correspondence with the nozzle arrangement of the print head 38 according to the print resolution of the print image and the nozzle pitch. For example, when the print resolution of the print image is 720 dpi and the nozzle pitch is $\frac{1}{180}$ inch, three raster lines will be printed between two raster lines that have been printed with adjacent nozzles. Therefore, data for every four raster lines is read out from the OL-compliant data as data corresponding to a scan movement of the writing carriage 36.

It should be noted that the memory size of the interlace buffer 692 is limited to 12 [Mbyte] as described above, so if the whole data size of the OL-compliant data that is successively transferred from the interlace processing unit 62 is large, the buffer will not be able to store all of the OL-compliant data. Therefore, in such cases, that is, when the free space in the interlace buffer 692 runs out, overwriting is permitted in the area where data that has already been read out and has been burst transmitted to the above-mentioned SRAM 621 used to exist. Since such a usage permits overwriting, there are cases in which OL-compliant data that corresponds only to a portion the print image printed according to this copying process remains in the interlace buffer 692 after a copying process for one sheet. Such a situation is likely to occur upon color copying at high print resolution, where the image data size of the original becomes large, and hardly occurs upon monochrome copying at low print resolution, where the image data size becomes small. It should be noted that the way of writing data into the area where the above-mentioned read-out and transferred data used to exist is not limited to the method of directly overwriting data in the above-mentioned area, as described above. For example, data can be written into the above-mentioned area after writing null data into that area. By the way, the interlace buffer 692 is used for the process of making a number of copies, which is the characteristic matter of the present invention described later.

The data transferred from the interlace buffer 692 is rearranged on the SRAM 621 so that it corresponds to the nozzle arrangement, and is sent to the image buffer unit 64.

The image buffer unit 64 burst transmits, to the image buffer 693, the image data that has been blocked into small pieces according to the memory size of the SRAM 621, and stores the data in proper orientation so that it becomes the head-drive data for making each of the nozzles eject ink per every scan movement of the writing carriage 36. Memory areas for storing head-drive data for two scan movements of the writing carriage 36 are allocated to the image buffers 693, 694. Every time head-drive data for one scan movement is stored, the CPU 54 sends it out to the head control unit 68, and head-drive data corresponding to the next scan movement starts to be written into the memory area provided for another scan movement. This process is the same as the process of the image buffers 571, 572 described above in the description of the printer function.

Under control of the CPU 54, the head-drive data for each scan movement stored in the image buffers 693, 694 is read into the CPU 54 via the CPUIF unit 66 and transferred to the head control unit 68 by the CPU 54. The head control unit 68 actuates the print head 38 according to the head-drive data to print the print image.

First Embodiment

Figure 13:
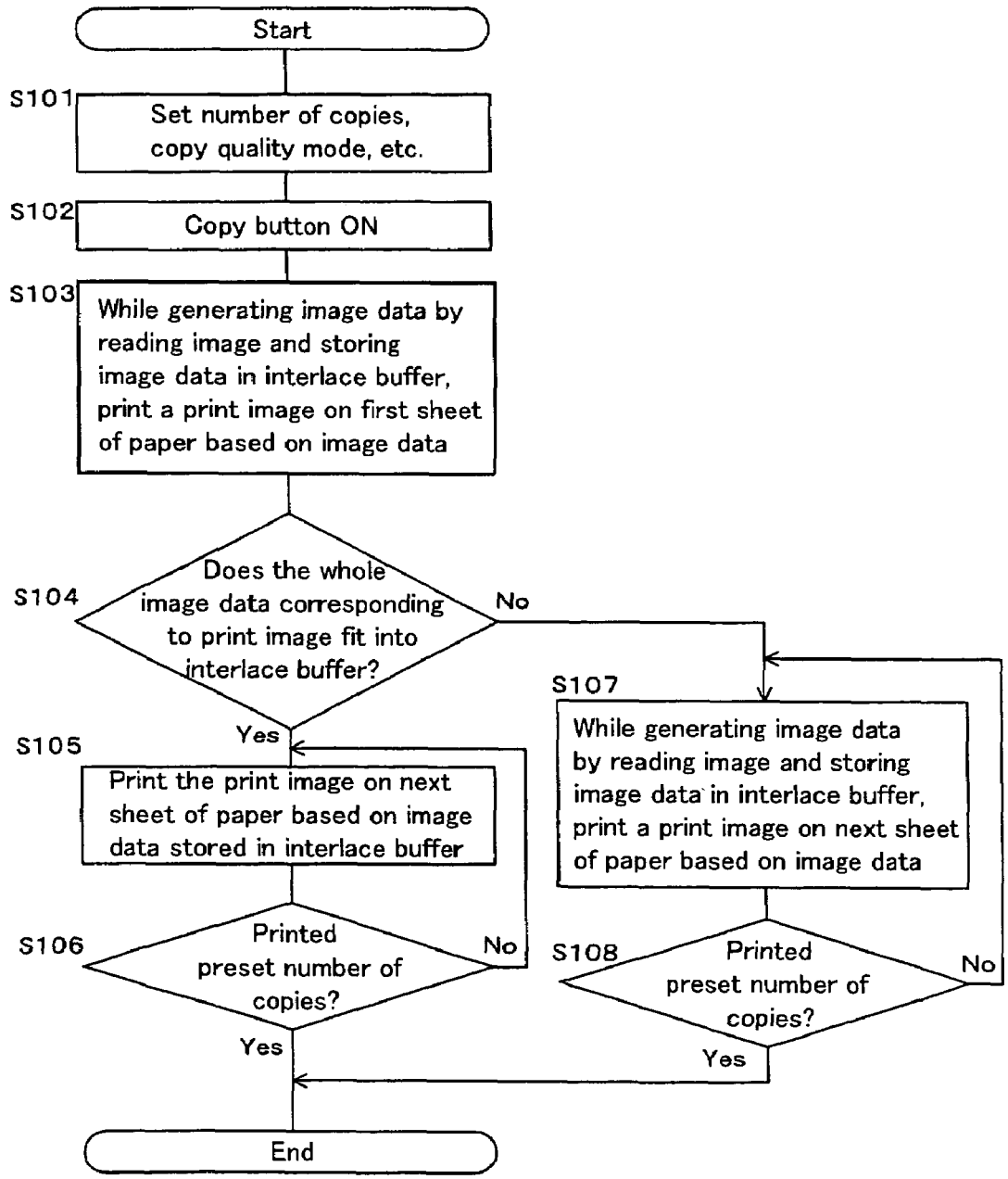
FIG. 13 is a flowchart for illustrating a first embodiment.

Next, the first embodiment of the present invention is described. This first embodiment relates to a process of making a number of copies of the same original. First, the process flow is described with reference to FIG. 10 and a flowchart shown in FIG. 13.

First, when the above-mentioned number-of-copies information, the copy-quality-mode information, and so forth, are entered through the control panel section 70 (S101) and either one of the color or monochrome copy button 84, 86 is pressed (S102), color/monochrome print mode information, accompanied with the above-mentioned information, is sent to the CPU 54. Then, the CPU 54 sends a copy start command to the control ASIC 51. Having received this, the control ASIC 51 makes the scanner unit 10 read the image in the original, performs the above-mentioned binarization processing, interlace processing, and so forth, to generate the CMYK image data (OL-compliant data), and stores this image data (OL-compliant data) in the interlace buffer 692. In parallel to this, the control ASIC 51 reads out the above-mentioned image data (OL-compliant data) from the interlace buffer 692, and, in cooperation with the CPU 54, makes the print head 38 print the print image on a first sheet according to the image data (OL-compliant data) (S103).

Next, before printing the second sheet, the CPU 54 determines whether or not the whole image data (OL-compliant data) corresponding to the print image on the first sheet can be stored, in terms of size, in the interlace buffer 692 (S104). It should be noted that in the present embodiment, this determination is made without directly comparing the memory size of the interlace buffer 692 and the image data size, but instead by referring to a determination result table, taking the copy-quality-mode information and the color/monochrome print mode information that have been entered through the control panel section 70 as keys. This will be described in detail later.

If it is determined that the whole data cannot be stored in terms of size, then the same command as that for the above-mentioned first sheet is sent to the control ASIC 51. Having received this, the control ASIC 51 makes the scanner unit 10 re-read the image in the original and carries out, in cooperation with the CPU 54, the process of making the print head 38 perform printing according to the image data (OL-compliant data) generated by re-reading. This process is repeated for the preset number of sheets (S107, S108).

On the other hand, if it is determined that the whole data can be stored in terms of size, the CPU 54 sends, to the control ASIC 51, a command to perform printing up to the preset number of sheets according to the image data (OL-compliant data) in the interlace buffer 692. Having received this, the control ASIC 51 performs printing, in association with the CPU 54, up to the above-mentioned preset number of sheets according to the image data (OL-compliant data) in the interlace buffer 692, without making the scanner unit 10 perform re-reading (S105, S106).

By performing such processes as those described above, since the re-reading operation is not performed at least when it is determined that the image data can be stored, in terms of size, in the interlace buffer 692, it is possible to shorten the time for copying. Further, the image data (OL-compliant data) that is stored in the interlace buffer 692 and that is used for printing on the second sheet and on is binary CMYK data.

Therefore, the image data size is small, and therefore, it is possible to make the memory size of the interlace buffer 692 small. More specifically, if the image data (OL-compliant data) is RGB data, the memory size necessary becomes large because the RGB data contains multi-gradation data about the darkness and thus the image data size becomes large. On the other hand, since the above-mentioned CMYK data is binary data, it becomes possible to make the image data size small, and therefore, a small memory size as described above is sufficient.

Here, the basic concept of determining whether or not the whole image data (OL-compliant data) that corresponds to the print image to be printed on the above-mentioned first sheet of paper can be stored, in terms of size, in the interlace buffer 692 is described. First, since the image data is written into and stored in the interlace buffer 692 in the form of binary CMYK data as described above, the image data size S [Byte] of the above-mentioned print image can be calculated according to the following equation:

$$S = Rh \times Rv \times W \times H \times A \times C/8$$

In the above equation, Rh [dpi] is the print resolution in the lateral direction of the print area, Rv [dpi] is the print resolution in the vertical direction of the print area, W [inch] is the width of the print area, and H [inch] is the height of the print area. A is the number of bits per pixel [pixel]. Further, C is the number of colors; the number is four colors, CMYK, for color copying, and one color—only K—for monochrome copying.

A specific example for this calculation is described. For example, when performing borderless color copying at a print resolution of Rh=Rv=720 [dpi] on the entire surface of A4 paper, the image data size S will be:

$$S = 720 \text{ [dpi]} \times 720 \text{ [dpi]} \times 8.268 \text{ [inch]} \times 11.7 \text{ [inch]} \times$$
$$2 \text{ [bit]} \times 4/8 \text{ [bit/byte]}$$
$$= 50147735 \text{ [byte]}$$
$$= 48 \text{ [Mbyte]}$$

Further, when performing borderless monochrome copying at a print resolution of Rh=Rv=720 [dpi] on the entire surface of A4 paper, S will be:

$$S = 720 \text{ [dpi]} \times 720 \text{ [dpi]} \times 8.268 \text{ [inch]} \times 11.7 \text{ [inch]} \times$$
$$2 \text{ [bit]} \times 1/8 \text{ [bit/byte]}$$
$$= 12536934 \text{ [byte]}$$
$$= 12.0 \text{ [Mbyte]}$$

It should be noted that the reason why the number of bits per pixel is 2 [bits] in the above-mentioned calculation example is because it requires 2 [bits] for the serial print signal for the above-mentioned mask circuits.

By comparing the image data size S calculated in this way with the memory size of the interlace buffer 692, it is possible to determine whether or not the whole image data, which corresponds to the print image to be printed on the first sheet of paper, can be stored, in terms of size, in the above-mentioned interlace buffer 692. By the way, the memory size of the interlace buffer 692 in the present embodiment is 12 [Mbyte]; therefore, it is determined that the data cannot be stored in terms of size for the above-mentioned color copying in which the image data size S according to the above-mentioned calculation example is 48 [Mbyte], whereas it is determined that the data can be stored in terms of size for monochrome copying in which the data size is 12.0 [Mbyte].

In the present embodiment, however, in order to achieve enhanced processing speed, determination is performed without performing complicated calculation processes such as the calculation of the above-mentioned image data size S and the comparison between the calculation results and the memory size. More specifically, a determination result table, in which determination results are gathered together, is stored in advance and provided in a ROM (not shown) of the CPU 54, and the CPU 54 carries out the determination simply by referring to the determination result table, taking the above-mentioned copy-quality-mode information and the color/monochrome print mode information, which have been entered through the control panel section 70, as keys.

Figure 14:
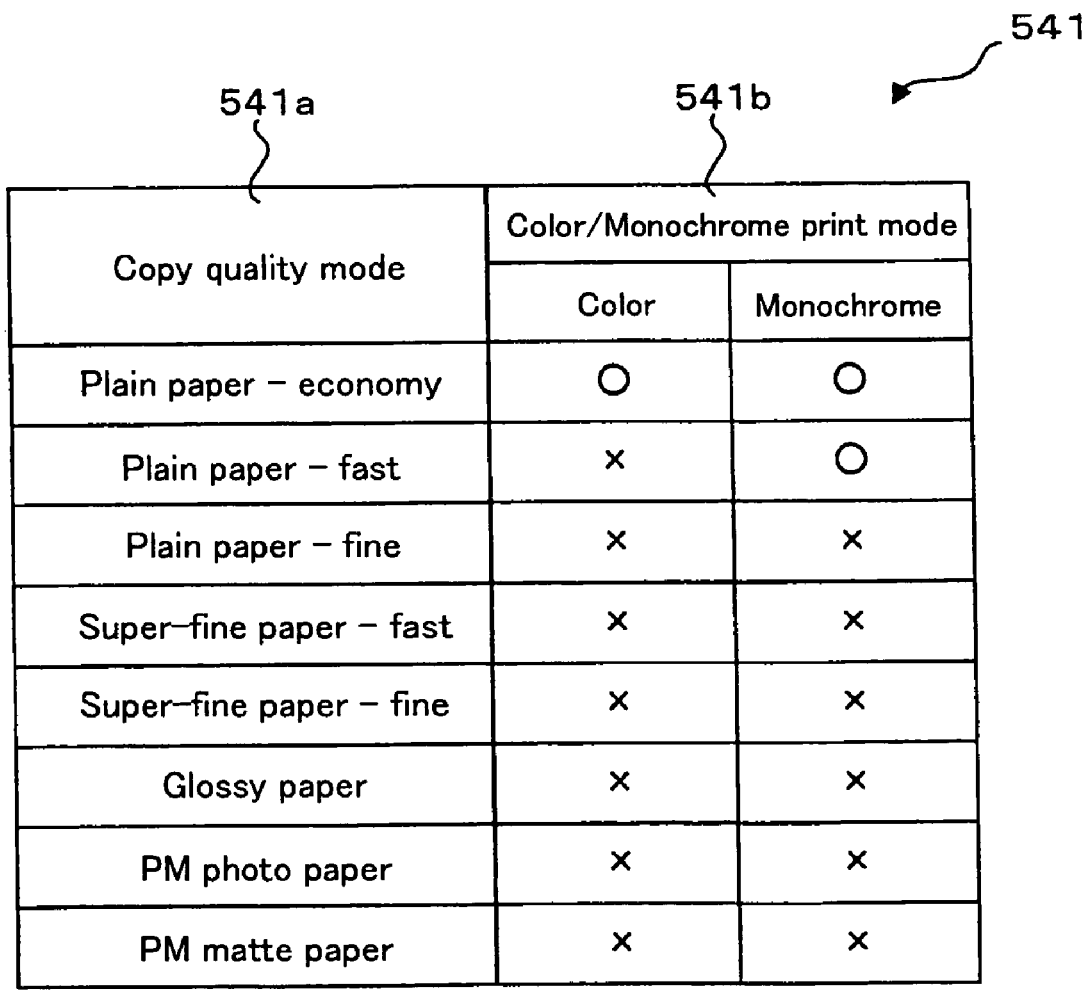
FIG. 14 is a determination result table.

The determination result table 541 is shown in FIG. 14. In the determination result table 541, a determination result is associated with and recorded for every combined mode that is a combination of the above-mentioned copy quality mode 541*a* and the color/monochrome print mode 541*b*. For example, a determination result, "fits in", indicated by the circle mark in the figure is associated with the combined mode in which the copy quality mode 541*a* is "plain paper+fast" and the color/monochrome print mode 541*b* is "monochrome". Further, a determination result, "does not fit in", indicated by the X mark is associated with the combined mode for "plain paper+fast" and "color". In the present embodiment, as shown in FIG. 14, the determination result, "fits in", is associated with at least three of the combined modes among the sixteen combined modes. Therefore, when the user selects one of the three combined modes, the re-reading operation by the scanner unit 10 is not performed, and therefore the user can make copies in a short time, as intended.

It should be noted that, the reason why a determination result is set for every combined mode made up of the above-mentioned copy quality mode 541*a* and the color/monochrome print mode 541*b* is because the print resolution in the above-mentioned equation differs according to the difference in the copy quality mode 541*a* and also the number of colors differs according to the difference in the color/monochrome print mode 541*b*, and thus, the image data size S of the above-mentioned print image changes due to these differences. By the way, the print resolution associated with each copy quality mode 541*a* in FIG. 11 described above is set so that it becomes higher toward the bottom of the figure.

Here, the method of preparing the determination result table 541 is described. Each determination result in the determination result table 541 has to be estimated and determined in advance so that the table can be stored in the above-mentioned ROM. Therefore, the above-mentioned determination result is determined by comparing, for each combined mode, the largest possible image data size Sm for each mode and the above-mentioned memory size of the interlace buffer 692. The maximum image data size Sm is calculated using the equation for the image data size described above. More specifically, a predetermined value that is uniquely defined for each of the above-mentioned combined modes is assigned to the print resolution Rh and Rv and the number of colors C in the equation, whereas the maximum print area printable by the printer section 30 is assigned to W×H, which is the size of the print area. In this way, the maximum image data size Sm for each combined mode is calculated.

For example, in the present embodiment, since the maximum paper size is A4 size as described above, the above-mentioned maximum print area size is 8.268 [inch] in width W and 11.7 [inch] in height H. Therefore, these values are substituted into the above-mentioned equation. Further, when the combined mode is "plain paper+fast" and "monochrome", since the print resolution in the lateral direction Rh is 720 [dpi], the print resolution in the vertical direction Rv is 720 [dpi], and the number of colors C is 1 [color], these values are further substituted into the above-mentioned equation. Thus, the maximum image data size Sm is calculated to be 12.0 [Mbyte]. This calculation result is compared with 12 [Mbyte], which is the memory size of the interlace buffer 692, and thus, a determination result, "fits in", is associated with this combined mode.

On the other hand, when the combined mode is "plain paper+fine" and "monochrome", which has a higher print resolution than the above, the print resolutions in the lateral and vertical directions Rh are 1440 [dpi] and 720 [dpi], respectively, and therefore, the image data size S is 24.0 [Mbyte]. Thus, a determination result, "does not fit in", is associated with this combined mode.

It should be noted that, in the embodiment described above, whether or not to perform the re-reading operation was determined by referring to the determination result table prepared in advance, taking the entered copy-quality-mode information and the color/monochrome print mode information as keys; however, the method for determination is not limited to this. For example, the interlace buffer may actually be referred to right before the printing process for the second sheet to actually check whether or not the whole image data, which corresponds to the print image, is in the interlace buffer. An example of this checking method is given below. For example, determination may be made as follows for methods in which the way the image data is overwritten in the interlace buffer is such that the data is overwritten and stored in order from the top address of the memory area. The image data that is first stored in the top address of the interlace buffer for printing the first sheet is also stored separately in an area that will not be overwritten, and right before each printing process for the second sheet and on, the image data in the above-mentioned top address is compared with the image data in the above-mentioned area that is not overwritten. If both pieces of data are the same, it is determined as "fitting in".

Second Embodiment

Next, the second embodiment of the present embodiment is described. The second embodiment is also about the process of making a number of copies of the same original.

Figure 15:
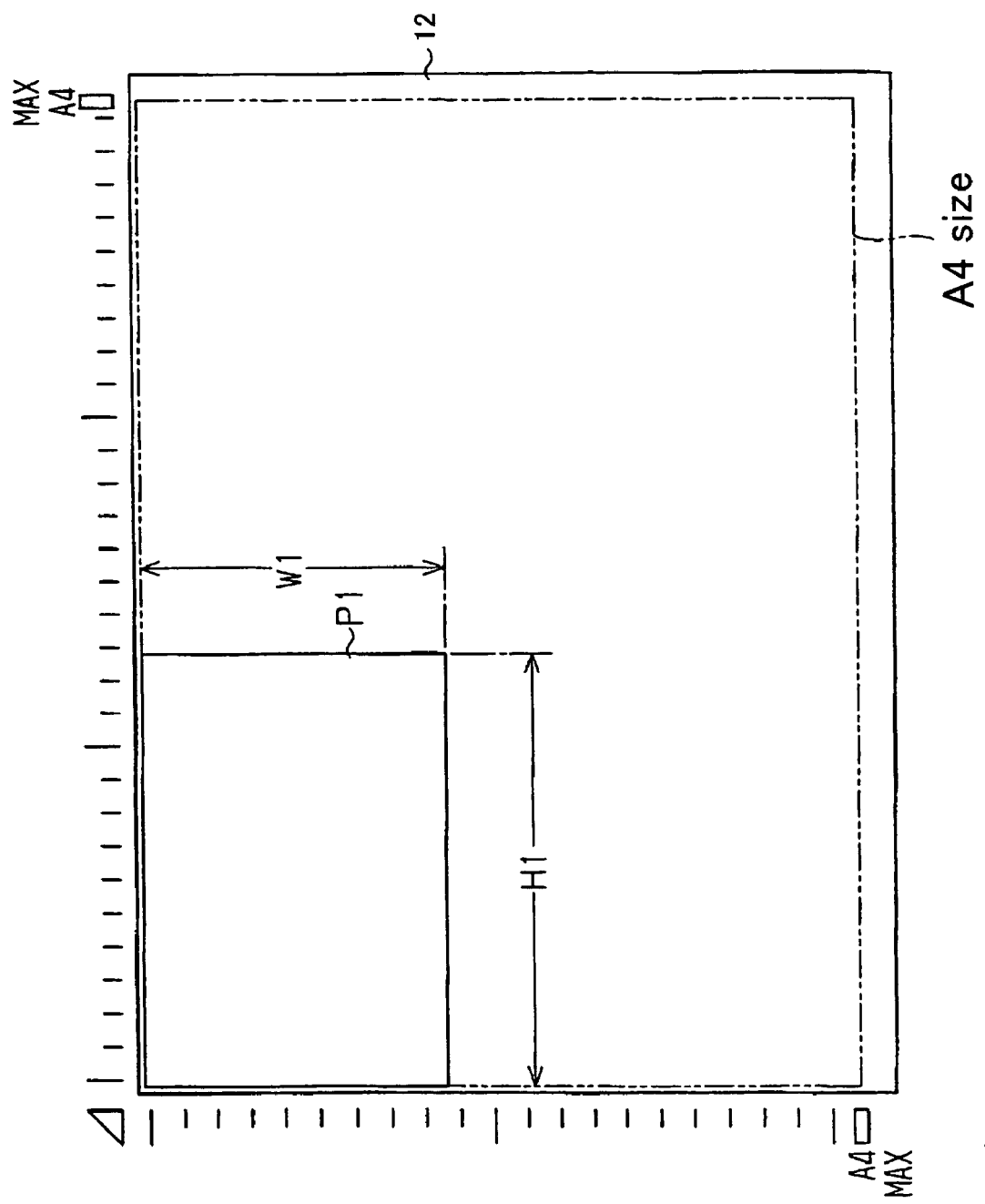
FIG. 15 is an explanatory diagram showing a state in which a photograph is placed on an original bed glass.

First, consideration is made for operations performed when placing an L-size photograph P1 on the original bed glass 12, as shown in FIG. 15, and making a number of copies on A4-size paper at a print resolution of 720 [dpi]. In such a situation, the scanner section 10 starts its reading operation on the assumption that a print image of A4 size is present, based on the maximum readable original size or the print paper size (width W of the print area×height H of the print area). At this time, image data corresponding to an A4-size area is transferred to the interlace buffer 692, and while the image data is being overwritten in the memory area of the interlace buffer 692, the copy-printing process for the first sheet is performed. Therefore, the scanner section 10 has to perform a re-reading operation of the photograph P1 when copy-printing the second sheet.

In the present second embodiment, the area of the image that is necessary for copy-printing is determined based on the image data obtained according to the original-reading operation for copy-printing the first sheet. Then, for the next copy-printing process, image data only for the area in which the print image actually exists is stored in the interlace buffer 692 based on the area determination.

Specifically, by performing the area determination when copy-printing the first sheet, the CPU 54 obtains the width W1 and the height H1 as the area necessary for copy-printing the photograph P1, and notifies the image processing circuit 65, the head control unit 68, and so forth, of the information including the width W1 and the height H1. The image processing circuit 65 performs image processing according to the width W1 and the height H1 and successively stores the image data in predetermined addresses of the interlace buffer 692.

Figure 16:
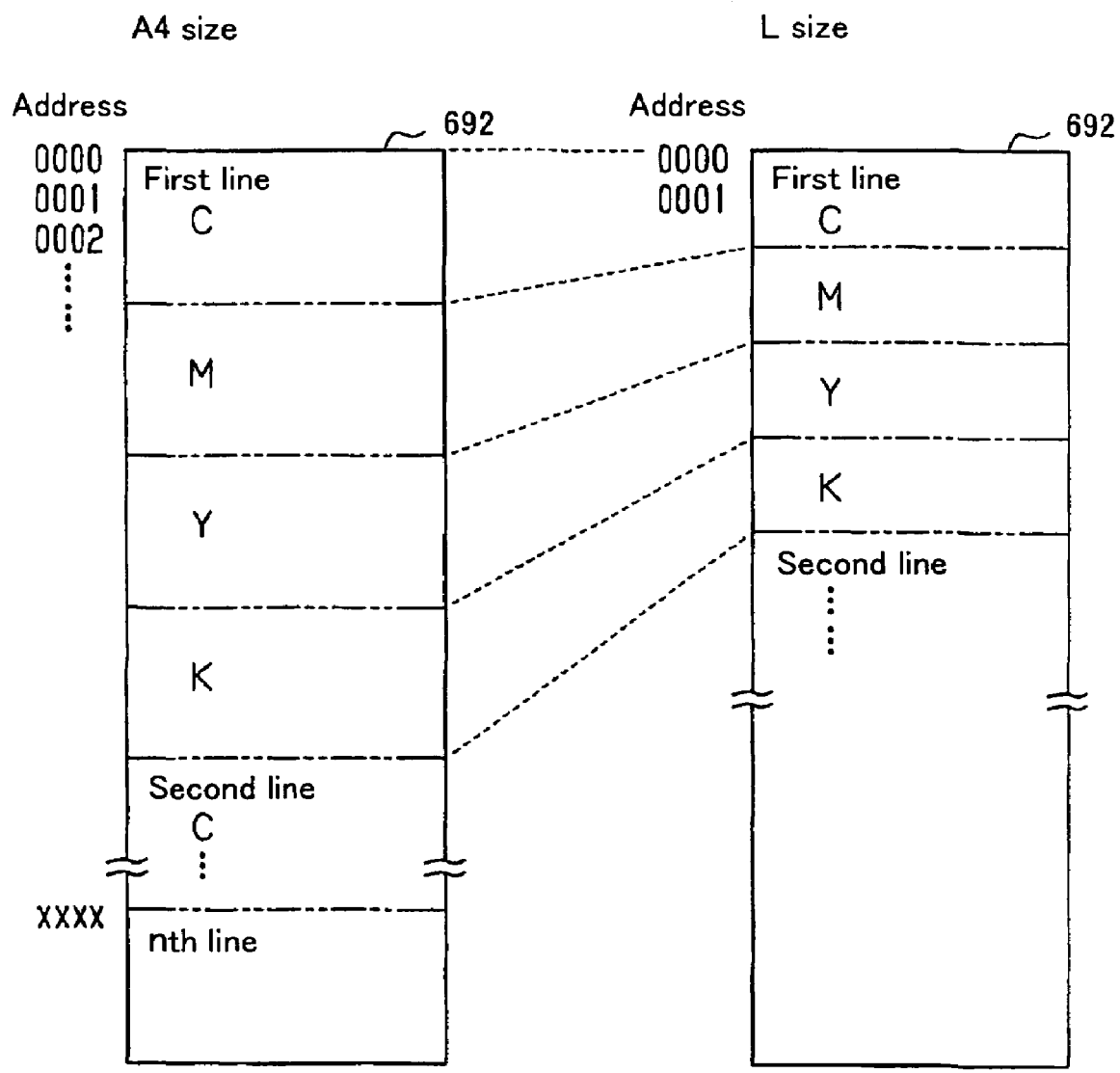
FIG. 16 is an explanatory diagram showing image data in an interlace buffer.

FIG. 16 shows a data image when storing image data corresponding to an A4-size print image in the interlace buffer 692 (left in the figure), and a data image when storing image data corresponding to a photo (L-) sized print image (right in the figure). As shown in FIG. 16, image data for each color (colors of C, M, Y, and K) are stored in order from the top address (address 0) in the interlace buffer 692. Here, the image data corresponding to the print image is smaller for the L size than the A4 size, and the addresses for the image data corresponding to each scan line in the image area that has been read by the scanner section 10 are changed.

When image data corresponding to the image area (W1× H1) of the photograph P1 is stored in the interlace buffer 692 in this way, it becomes possible to store, in terms of size, the whole image data corresponding to the print image in the buffer. Then, since the re-reading operation by the scanner section 10 can be omitted for the copy-printing process for the third sheet and on by using the image data stored in the interlace buffer 692, the processing time for making a number of copies can be shortened.

That is, according to the SPC multifunction apparatus 1 of the present embodiment, when making a number of copies, the area of the image taken in upon the copy-printing process for the first sheet is determined, and according to the results of this area determination, it is determined whether or not the whole image data corresponding to the print image can be stored, in terms of size, in the interlace buffer 692. Further, the apparatus is configured so that the copy-printing process for the second sheet and on changes according to whether the image data can be stored, in terms of size, in the interlace buffer 692 or not.

Figure 17:
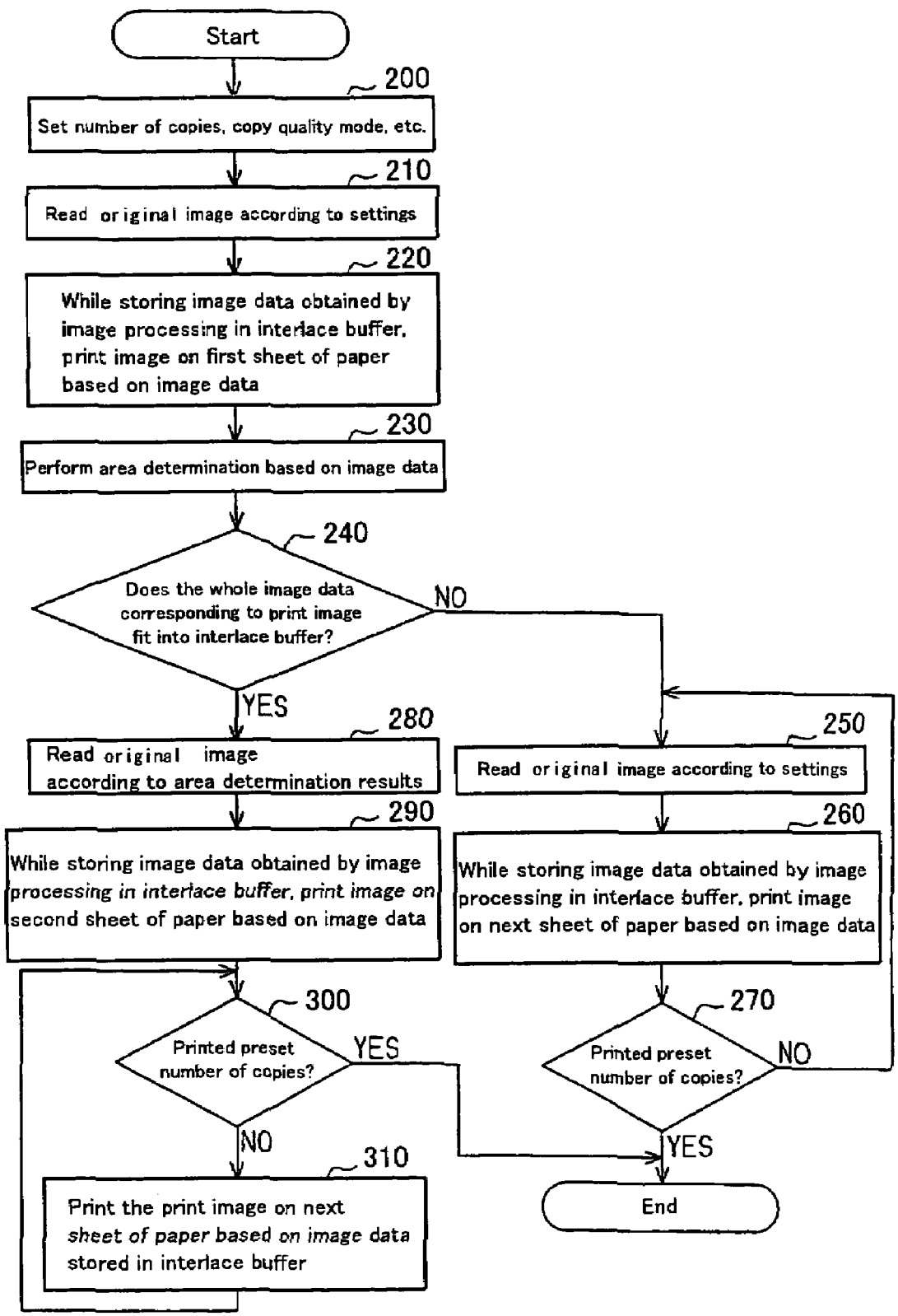
FIG. 17 is a flowchart for illustrating a second embodiment.

Next, the process for making a number of copies in the SPC multifunction apparatus 1 is described using the flowchart in FIG. 17.

First, the user sets the number of copies (for example, five sheets) by operating the number-of-copies-setting buttons 90 on the control panel section 70, and also sets the copy quality mode and so forth by operating the menu buttons 92. Then, after placing the photograph P1 on the original bed glass 12, the processes in FIG. 17 are started when the color copy button 84 is turned ON.

In step 200, the CPU 54 receives, from the control panel section 70, information about the number of copies, the copy quality mode, and so forth, sets the information in the SDRAM 56, and sends a copy start command to the control ASIC 51. In the following step 210, the control ASIC 51 outputs control signals to the scanner section 10 according to those settings and makes the scanner section 10 read the original image. Here, the scanner section 10 reads the photograph P1 at a predetermined read resolution included in the copy-quality-mode information, on the assumption that a print image of the maximum original size (A4 size) is present.

In step 220, the control ASIC 51 outputs, to the image processing circuit 65, control signals according to the settings about the print size, the print resolution, and so forth, and makes the image processing circuit 65 perform predetermined image processing (such as color conversion processing, halftone processing, and interlace processing). At this time, image data that has gone through interlace processing is successively stored from the image processing circuit 65 into the predetermined addresses of the interlace buffer 692. Then, the control ASIC 51 transfers the image data to the head control unit 68 and prints the image of the photograph P1 on a first sheet of paper by actuating the print head 38 according to the data, in cooperation with the CPU 54. Further, at this time, the CPU 54 thins out the image data at a predetermined rate to temporarily store image data that has a lower resolution (for example, 50 [dpi]) than the print resolution in the SDRAM 56.

Then, in step 230, the CPU 54 uses the low-resolution image data stored in the SDRAM 56 to determine the area of the read-in image, and in the next step 240, it determines whether or not the whole image data that corresponds to the print image can be stored, in terms of size, in the interlace buffer 692. That is, according to the area determination, the CPU 54 obtains information such as the width W1 and the height H1 as the area in which the print image actually exists (the image area of the photograph P1), and based on this information, it calculates the image data size S of the print image. Then, by comparing the size S and the memory size of the interlace buffer 692, the CPU determines whether or not the image data can be stored, in terms of size, in the interlace buffer 692.

Here, if it is determined that the image data cannot be stored in terms of size, the process proceeds to step 250, and the control ASIC 51 outputs control signals according to the settings to the scanner section 10 to make the scanner section 10 read the original image, as in step 210. Also in the following step 260, the image of the photograph P1 is printed on the second sheet of paper by performing the image processing, successively storing the image data in the interlace buffer 692, and actuating the print head 38 according to the image data, as in step 220. Then, until it is determined in step 270 that the preset number of copies (five sheets) has been printed, the process of steps 250 and 260 is repeated, and the present processing is finished when five sheets have been printed.

On the other hand, when it is determined in step 240 that the image data can be stored in terms of size, the process proceeds to step 280, and the control ASIC 51 outputs control signals according to the area determination results to the scanner section 10 to make the scanner section 10 read the original image. Here, the scanner section 10 changes the scan width, that is, the amount the scanner section 10 moves to read the image in the original, according to the image size (L size) of the photograph P1 obtained as a result of the area determination, and then it reads the photograph P1.

In step 290, the control ASIC 51 outputs, to the image processing circuit 65, control signals including the width W1 and the height H1 of the image area obtained as a result of the above-mentioned area determination to make the image processing circuit 65 perform image processing (such as color conversion processing, halftone processing, and interlace processing) according to the image area. Then, image data that has gone through interlace processing is successively stored from the image processing circuit 65 into the predetermined addresses of the interlace buffer 692. Then, the control ASIC 51 transfers the image data to the head control unit 68 and prints the image of the photograph P1 on a second sheet of paper by actuating the print head 38 according to the data, in cooperation with the CPU 54. In the process of step 290, the write address and the read address of the image data in the interlace buffer 692 are changed with respect to the process of step 220 or step 260 (refer to FIG. 16). That is, the addresses for the image data to be stored are set according to the width W1 and the height H1 of the image area obtained as a result of the area determination, and the whole image data corresponding to the photo-size (L-size) print image is stored in the interlace buffer 692.

Then, in step 300, the CPU 54 determines whether or not the preset number of copies (five sheets) has been printed. If they have not been printed, the process proceeds to step 310, and the image of the photograph P1 is printed on the paper using the image data stored in the interlace buffer 692. Then, the printing process of step 310 is repeated for the preset number of sheets, and the present processing is finished when the preset number of sheets has been printed.

As described above, the following effects are obtained according to the present second embodiment:

(1) When copy-printing the photograph P1 on the first sheet, the area of the image of the photograph P1 that is necessary for copy-printing is determined based on the image data obtained according to the image data read by the scanner section 10. That is, area determination of the original is performed along with the copy-printing for the first sheet. Further, it is possible to appropriately perform copy-printing for the second sheet and on according to the results of the area determination. Specifically, when copy-printing the second sheet, the image data corresponding to the image read by the scanner section 2 is stored in the interlace buffer 692 based on the results of the area determination. If the whole image data corresponding to the image can be stored in the interlace buffer 692, copy-printing for the third sheet and on is performed using the image data stored in the interlace buffer 692. Therefore, as for the copy-printing processing for the third sheet and on, the re-reading operation of the scanner section 10 is omitted, and thus it is possible to perform the copy-printing processing at high speed.

(2) When copy-printing the second sheet, since the scan width of the scanner section 10 is changed based on the results of the area determination, it is possible to shorten the amount of time (scan time) for reading.

(3) If it is determined that the image data cannot be stored, in terms of size, the interlace buffer 692, the scanner section 10 performs the reading operation every time copy-printing for the second sheet and on is performed according to the same scan width as that for the copy-printing for the first sheet, and copy-printing up to the preset number of sheets is performed using the image data obtained by the reading operation. This is practically preferable because in such cases, the same printing process is implemented for the copy-printing for the first sheet and the copy-printing for the second sheet and on.

(4) Since the area of the image of the photograph P1 is determined according to image data having a lower resolution than the print resolution, the process load of, for example, the CPU 54 is reduced compared to cases where the area determination is performed using image data in the print resolution, and therefore, it is possible to perform the area determination processing quickly.

Below, another second embodiment implementing the present invention is described.

In this other second embodiment, the structure of the SPC multifunction apparatus 1 is the same as that of the above-mentioned second embodiment, but the process of making a number of copies is different from the above-mentioned second embodiment. More specifically, in the above-mentioned second embodiment, the scanner section 10 carries out the reading operation according to the settings (A4 size, which is the maximum original size) if it is determined that the whole image data cannot be stored, in terms of size, the interlace buffer 692 based on the image area determination (step 250 in FIG. 17). On the contrary, in this other second embodiment, the scan width of the scanner section 10 is changed based on the image area determination, regardless of whether the whole image data can be stored, in terms of size, in the interlace buffer 692 or not. Below, description is made centering on points different from the above-mentioned second embodiment.

Figure 18:
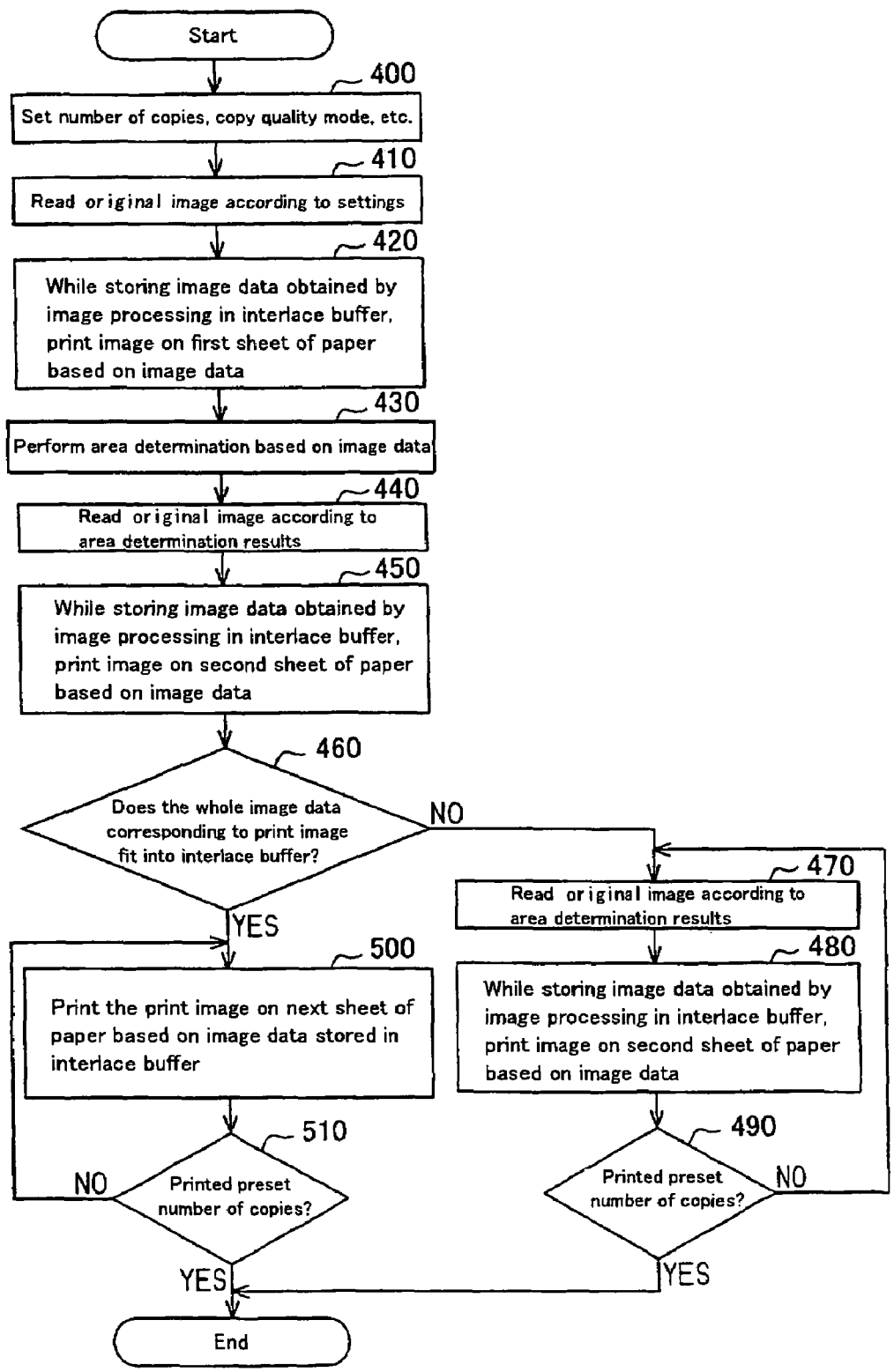
FIG. 18 is a flowchart for illustrating another second embodiment.

FIG. 18 is a flowchart for illustrating the other second embodiment. In FIG. 18, the processes of step 400 through step 430 are the same as the processes of step 200 through step 230 in FIG. 17; therefore, here, description is made from the process in step 430.

That is, after image area determination is performed in step 430, the process proceeds to step 440, and the control ASIC 51 outputs, to the scanner section 10, control signals according to the results of the area determination to make the scanner section 10 read the original image. Here, the scanner section 10 changes the scan width according to the image size (L size) of the photograph P1 obtained as a result of the area determination, and then it reads the photograph P1.

In step 450, the control ASIC 51 outputs, to the image processing circuit 65, control signals including the width W1 and the height H1 of the image area obtained as a result of the above-mentioned area determination, and makes the image processing circuit 65 perform image processing (such as color conversion processing, halftone processing, and interlace processing) according to the image area. At this time, image data that has gone through interlace processing is successively stored from the image processing circuit 65 into the predetermined addresses of the interlace buffer 692. Then, the control ASIC 51 transfers the image data to the head control unit 68 and prints the image of the photograph P1 on a second sheet of paper by actuating the print head 38 according to the data, in cooperation with the CPU 54. It should be noted that, if the preset number of copies is two sheets, the printing process is ended, whereas if it is three sheets or more, the process proceeds to step 460.

In step 460, the CPU 54 determines whether or not the whole image data corresponding to the print image can be stored, in terms of size, in the interlace buffer 692. That is, based on the area in which the print image exists (such as the width W1 and the height H1 of the image area of the photograph P1) obtained according to the area determination in step 430, the CPU 54 calculates the image data size S of the print image and compares the size S and the memory size of the interlace buffer 692. Then, according to the comparison results, the CPU determines whether or not the image data can be stored, in terms of size, in the interlace buffer 692.

Here, if it is determined that the image data cannot be stored in terms of size, the process proceeds to step 470, and as in step 440, the control ASIC 51 outputs control signals according to the above-mentioned area determination results to the scanner section 10 to make the scanner section 10 read the original image. Also in the following step 480, the image of the photograph P1 is printed on the next sheet of paper by performing the image processing, successively storing the image data in the interlace buffer 692, and actuating the print head 38 according to the image data, as in step 450. Then, until it is determined in step 490 that the preset number of copies has been printed, the process of steps 470 and 480 is repeated, and the present processing is finished when the preset number of copies has been printed.

On the other hand, if it is determined in step 460 that the image data can be stored in terms of size, the process proceeds to step 500, and the control ASIC 51 prints the image of the photograph P1 on the paper using the image data stored in the interlace buffer 692. Then, the process of step 500 is repeated until it is determined in step 510 that the preset number of copies has been printed, and the present processing is finished when the preset number of copies has been printed.

As described above, the following effects are obtained according to this other second embodiment:

(1) When copy-printing the photograph P1 on the first sheet, the area of the image of the photograph P1 that is necessary for copy-printing is determined based on the image data read by the scanner section 10. Then, in copy-printing the second sheet and on, since the scan width of the scanner section 10 is changed based on the results of the area determination, it is possible to shorten the amount of time (scan time) for reading.

(2) In copy-printing the second sheet and on, the image data corresponding to the image that has been read by the scanner section 10 is stored in the interlace buffer 692 based on the results of the area determination. If the whole image data corresponding to the image is stored in the interlace buffer 692, it is possible to perform copy-printing for the third sheet and on using the image data stored in the interlace buffer 692.

It should be noted that the above-mentioned embodiment may be implemented as follows.

Before performing the area-determination processing in step 230 in FIG. 17 (or in step 430 in FIG. 18), a process of determining, based on the copy-quality-mode information and so forth, whether or not the whole image data corresponding to the print image (the A4-size image) can be stored, in terms of size, in the interlace buffer 692 (that is, the process described in the first embodiment) may be added. If it is determined that the data can be stored in terms of size, the process of steps 230 through 290 in FIG. 17 (steps 430 through 490) is skipped, and copy-printing is performed in step 310 (step 500) using the image data stored in the interlace buffer 692. On the other hand, if it is determined that the data cannot be stored in terms of size based on the copy-quality-mode information and so forth, the process proceeds to step 230 (step 430), and the process of steps 230 through 310 (steps 430 through 510) is performed, as in the above-mentioned embodiment. In this case, if it is determined that the whole image data corresponding to the print image of the maximum print size can be stored, in terms of size, in the interlace buffer 692 because the print resolution, for example, set in advance is low, it is possible to achieve high-speed copy-printing processing using the image data in the interlace buffer 692, without performing the area-determination processing and so forth. Further, even when it is determined that the data cannot be stored in terms of size based on the copy-quality-mode information and so forth, the area of the actual image that is necessary for copy-printing will be determined based on the image data generated according to the print-image-reading operation of the scanner section 10, and it will also be determined whether or not the whole image data corresponding to that image can be stored, in terms of size, in the interlace buffer 692. If it is then determined that the data can be stored in terms of size, the image data that becomes necessary for copy-printing is stored in the interlace buffer 692 based on the results of the area determination, and therefore, it is possible to perform the copy-printing up to the preset number of sheets in a short amount of time using that image data.

In the above-mentioned embodiment, the apparatus was configured so that the scan width of the scanner section 10 is changed based on the image area determination, and then the image data is stored in the interlace buffer 692; however, this is not a limitation. That is, it is possible to store the image data corresponding to the size (L size) of the photograph P1 in the interlace buffer 692 (refer to FIG. 16) without changing the scan width of the scanner section 10, but by extracting image data corresponding to the print image by means of image processing with the image processing circuit 65 based on the image area determination. Even in this way, it is possible to appropriately store in the interlace buffer 692 the image data necessary for copy-printing, and therefore, it is possible to achieve high-speed copy-printing processing using the image data in the interlace buffer 692.

In the above-mentioned embodiment, the area of the image of the photograph P1 was determined based on image data that was taken in by the scanner section 10 for copy-printing the first sheet, i.e., based on image data generated according to an image-reading operation accompanied with printing; however, this is not a limitation. That is, in a process of making a number of copies, the area determination may be performed based on image data that is generated according to an image-reading operation of the scanner section 10 that is not accompanied with printing. Specifically, the first reading operation may be a pre-scan operation for taking in the image at a resolution (a resolution lower than the print resolution) necessary for area determination.

Technical ideas that can be grasped from the above-mentioned embodiments are described below.

(1) It is characterized in that information about the width and the height of an original image is obtained according to the above-mentioned area determination processing, and based on this information, it is determined whether or not the whole image data corresponding to the above-mentioned image can be stored, in terms of size, in the above-mentioned memory area.

(2) It is characterized in that the image data used for the above-mentioned area determination is at a lower resolution than the print resolution.

(3) It is characterized in that the write address and the read address of the image data in the above-mentioned memory area are changed based on the above-mentioned area determination.

Other Embodiments

Above, a printing method and so forth according to the present invention were described according to embodiments thereof. However, the above-mentioned embodiments of the invention have been given for facilitating understanding of the present invention and are not to limit the present invention. It goes without saying that the present invention may be altered and/or modified without departing from the gist thereof, and that the present invention includes its equivalents.

An SPC multifunction apparatus was described as a printing apparatus in the foregoing embodiments; however, this is not a limitation. For example, technology like that of the present embodiments can also be applied to multifunction systems that provide the function as a copying machine by connecting a scanner and a printer that exist as separate apparatuses. Further, technology like that of the present embodiments can also be applied to, for example, color filter manufacturing devices, dyeing devices, fine processing devices, semiconductor manufacturing devices, surface processing devices, three-dimensional shape forming machines, liquid vaporizing devices, organic EL manufacturing devices (particularly macromolecular EL manufacturing devices), display manufacturing devices, film formation devices, or DNA chip manufacturing devices.

Further, in the foregoing embodiments, ink such as dye ink or pigment ink was ejected from the nozzles. However, the liquid that is ejected from the nozzles is not limited to such inks. For example, it is also possible to eject from the nozzles a liquid (including water) including, for example, metallic material, organic material (particularly polymeric material), magnetic material, conductive material, wiring material, film forming material, electronic ink, machining liquid, or genetic solution.

Further, in the foregoing embodiments, ink was ejected using piezoelectric elements. However, the method for ejecting liquid is not limited to this. Other methods may also be employed, such as a method for generating bubbles in the nozzles using heat.

Further, in the foregoing embodiments, printing of a number of copies was performed based on the image data stored in the interlace buffer to omit re-reading with the scanner section; however, this is not a limitation. For example, if the whole image data corresponding to the original image is stored in the image buffer, it is possible to perform printing up to the preset number of sheets based on the image data in the image buffer.

What is claimed is:

1. A printing method for printing a print image on a medium, using a first print mode for printing an output image data that is successively generated due to a reading operation of reading an image in an original, while partly overwriting the output image data onto a memory area as necessary, and a second print mode for printing the whole output image data stored in the memory area by successively reading out the whole output image data from the memory area, comprising:
    performing printing on a first sheet in the first print mode according to a first reading operation;
    performing an area determination for determining which area, in the original, is an area in which a print image exist according to the first reading operation;
    determining whether or not the whole output image data can be stored in the memory area by estimating the whole output image data size, according to size of the area determined in the area determination, print resolution, number of bits per pixel, and number of colors;
    in case where said determining yields that the whole output image data can be stored in the memory area,
        storing the whole output image data in the memory area according to a second reading operation, and
        performing each printing from the second sheet in the second print mode, and
    in case where said determining yields that the whole output image data cannot be stored in the memory area,
        performing each printing from the second sheet in the first print mode.

* * * * *